US012103051B2

(12) United States Patent
Smith et al.

(10) Patent No.: US 12,103,051 B2
(45) Date of Patent: Oct. 1, 2024

(54) APPARATUS AND METHODS EMPLOYING LIQUID-IMPREGNATED SURFACES

(71) Applicant: Massachusetts Institute of Technology, Cambridge, MA (US)

(72) Inventors: J. David Smith, Arlington, MA (US); Sushant Anand, Somerville, MA (US); Srinivas Prasad Bengaluru Subramanyam, Cambridge, MA (US); Konrad Rykaczewski, Scottsdale, AZ (US); Kripa K. Varanasi, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 586 days.

(21) Appl. No.: 17/108,889

(22) Filed: Dec. 1, 2020

(65) Prior Publication Data
US 2021/0291243 A1  Sep. 23, 2021

Related U.S. Application Data

(63) Continuation of application No. 14/443,620, filed as application No. PCT/US2013/070827 on Nov. 19, 2013, now Pat. No. 10,882,085.
(Continued)

(51) Int. Cl.
*B08B 17/06* (2006.01)
*B64D 15/06* (2006.01)
(Continued)

(52) U.S. Cl.
CPC ............ *B08B 17/065* (2013.01); *B64D 15/06* (2013.01); *B64F 5/20* (2017.01); *C09D 5/1656* (2013.01);
(Continued)

(58) Field of Classification Search
CPC ......... B08B 17/065; B64D 15/06; B64F 5/20; C09D 5/1656; C09D 5/1662;
(Continued)

(56) References Cited

U.S. PATENT DOCUMENTS

| 3,784,471 A | 1/1974 | Kaiser |
| 4,069,933 A | 1/1978 | Newing |

(Continued)

FOREIGN PATENT DOCUMENTS

| CN | 1721030 A | 1/2006 |
| CN | 100344341 C | 10/2007 |

(Continued)

OTHER PUBLICATIONS

International Search Report and Written Opinion for application PCT/US2011/061498 mailed Jul. 31, 2012.
(Continued)

*Primary Examiner* — James C Goloboy
(74) *Attorney, Agent, or Firm* — Wolf, Greenfield & Sacks, P.C.

(57) ABSTRACT

In certain embodiments, the invention is directed to apparatus comprising a liquid-impregnated surface, said surface comprising an impregnating liquid and a matrix of solid features spaced sufficiently close to stably contain the impregnating liquid therebetween or therewithin, and methods thereof. In some embodiments, one or both of the following holds: (i) $0<\phi\leq0.25$, where $\phi$ is a representative fraction of the projected surface area of the liquid-impregnated surface corresponding to non-submerged solid at equilibrium; and (ii) $S_{ow(a)}<0$, where $S_{ow(a)}$ is spreading coefficient, defined as $\gamma_{wa}-\gamma_{wo}-\gamma_{oa}$, where $\gamma$ is the interfacial tension between the two phases designated by subscripts w, a, and o, where w is water, a is air, and o is the impregnating liquid.

18 Claims, 15 Drawing Sheets

Related U.S. Application Data

(60) Provisional application No. 61/827,444, filed on May 24, 2013, provisional application No. 61/728,219, filed on Nov. 19, 2012.

(51) Int. Cl.

| | | |
|---|---|---|
| *B64F 5/20* | (2017.01) | |
| *C09D 5/16* | (2006.01) | |
| *C09D 167/00* | (2006.01) | |
| *C09D 179/08* | (2006.01) | |
| *C09D 183/04* | (2006.01) | |
| *F28F 19/00* | (2006.01) | |

(52) U.S. Cl.
CPC ......... *C09D 5/1662* (2013.01); *C09D 5/1675* (2013.01); *C09D 5/1681* (2013.01); *C09D 5/1693* (2013.01); *C09D 167/00* (2013.01); *C09D 179/08* (2013.01); *C09D 183/04* (2013.01); *F28F 19/006* (2013.01); *F28F 2245/04* (2013.01)

(58) Field of Classification Search
CPC .. C09D 5/1675; C09D 5/1681; C09D 5/1693; C09D 167/00; C09D 179/08; C09D 183/04; F28F 19/006; F28F 2245/04
See application file for complete search history.

(56) References Cited

U.S. PATENT DOCUMENTS

| | | | |
|---|---|---|---|
| 4,125,152 A | 11/1978 | Kestner et al. | |
| 4,204,021 A | 5/1980 | Becker | |
| 4,316,745 A | 2/1982 | Blount | |
| 4,503,099 A | 3/1985 | Chang et al. | |
| 4,780,211 A | 10/1988 | Lien | |
| 5,083,606 A | 1/1992 | Brown et al. | |
| 5,133,516 A | 7/1992 | Marentic et al. | |
| 5,154,741 A | 10/1992 | da Costa Filho | |
| 5,624,713 A | 4/1997 | Ramer | |
| 5,674,592 A | 10/1997 | Clark et al. | |
| 5,816,280 A | 10/1998 | Rojey et al. | |
| 5,817,898 A | 10/1998 | Delion et al. | |
| 5,853,802 A | 12/1998 | Boyer et al. | |
| 5,900,516 A | 5/1999 | Talley et al. | |
| 5,936,040 A | 8/1999 | Costello et al. | |
| 5,955,165 A | 9/1999 | Zamora et al. | |
| 6,028,234 A | 2/2000 | Heinemann et al. | |
| 6,093,862 A | 7/2000 | Sinquin et al. | |
| 6,216,472 B1 | 4/2001 | Cathenaut et al. | |
| 6,247,603 B1 | 6/2001 | Farrell et al. | |
| 6,329,490 B1 | 12/2001 | Yamashita et al. | |
| 6,389,820 B1 | 5/2002 | Rogers et al. | |
| 6,649,266 B1 | 11/2003 | Gross et al. | |
| 6,887,230 B2 | 5/2005 | Kubulak et al. | |
| 7,041,363 B2 | 5/2006 | Krohmer et al. | |
| 7,323,221 B2 | 1/2008 | Heppekausen et al. | |
| 7,458,384 B1 | 12/2008 | Seal et al. | |
| 7,597,148 B2 | 10/2009 | O'Malley et al. | |
| 7,622,197 B2 | 11/2009 | Balow et al. | |
| 7,687,593 B2 | 3/2010 | Yamahiro et al. | |
| 7,722,951 B2 | 5/2010 | Li et al. | |
| 7,887,934 B2 | 2/2011 | Gentleman et al. | |
| 7,892,660 B2 | 2/2011 | Gentleman et al. | |
| 7,897,271 B2 | 3/2011 | Gentleman et al. | |
| 7,901,798 B2 | 3/2011 | Gentleman et al. | |
| 7,977,267 B2 | 7/2011 | Gentleman et al. | |
| 7,985,451 B2 | 7/2011 | Luzinov et al. | |
| 8,003,178 B2 | 8/2011 | Kim et al. | |
| 8,057,922 B2 | 11/2011 | Gentleman et al. | |
| 8,057,923 B2 | 11/2011 | Gentleman et al. | |
| 8,062,775 B2 | 11/2011 | Gentleman et al. | |
| 8,173,279 B2 | 5/2012 | Gentleman et al. | |
| 8,178,219 B2 | 5/2012 | Gentleman et al. | |
| 8,222,172 B2 | 7/2012 | Gentleman et al. | |
| 8,235,096 B1 | 8/2012 | Mahefkey et al. | |
| 8,236,432 B2 | 8/2012 | Gentleman et al. | |
| 8,252,259 B2 | 8/2012 | Seal et al. | |
| 8,377,390 B1 | 2/2013 | Brueck et al. | |
| 8,394,872 B2 * | 3/2013 | Faust, Jr. ............... | C09K 8/588 |
| | | | 523/175 |
| 8,535,779 B1 | 9/2013 | Smith et al. | |
| 8,574,704 B2 | 11/2013 | Smith et al. | |
| 8,859,090 B2 | 10/2014 | Angelescu et al. | |
| 8,940,361 B2 | 1/2015 | Smith et al. | |
| 9,121,306 B2 | 9/2015 | Aizenberg et al. | |
| 9,254,496 B2 | 2/2016 | Dhiman et al. | |
| 9,309,162 B2 | 4/2016 | Azimi et al. | |
| 9,371,173 B2 | 6/2016 | Smith et al. | |
| 9,381,528 B2 | 7/2016 | Dhiman et al. | |
| 9,625,075 B2 | 4/2017 | Smith et al. | |
| 10,882,085 B2 | 1/2021 | Smith et al. | |
| 10,968,035 B2 | 4/2021 | Smith et al. | |
| 11,058,803 B2 | 7/2021 | Smith et al. | |
| 2002/0146540 A1 | 10/2002 | Johnston et al. | |
| 2002/0164443 A1 | 11/2002 | Oles et al. | |
| 2002/0171067 A1 | 11/2002 | Jolly et al. | |
| 2003/0017303 A1 | 1/2003 | Sindo et al. | |
| 2003/0037914 A1 | 2/2003 | Inbe et al. | |
| 2003/0096083 A1 | 5/2003 | Morgan et al. | |
| 2003/0134035 A1 | 7/2003 | Lamb et al. | |
| 2003/0203117 A1 | 10/2003 | Bartkowiak et al. | |
| 2003/0226806 A1 | 12/2003 | Young et al. | |
| 2004/0003619 A1 | 1/2004 | Lee et al. | |
| 2004/0026832 A1 | 2/2004 | Gier et al. | |
| 2004/0037961 A1 | 2/2004 | Dileman et al. | |
| 2004/0219373 A1 | 11/2004 | Deruelle et al. | |
| 2004/0243249 A1 | 12/2004 | Ishihara et al. | |
| 2005/0003146 A1 | 1/2005 | Spath | |
| 2005/0009953 A1 | 1/2005 | Shea | |
| 2005/0016489 A1 | 1/2005 | Endicott et al. | |
| 2005/0061221 A1 | 3/2005 | Paszkowski | |
| 2005/0112326 A1 | 5/2005 | Nun et al. | |
| 2005/0136217 A1 | 6/2005 | Barthlott et al. | |
| 2005/0208272 A1 | 9/2005 | Groll | |
| 2006/0007515 A1 | 1/2006 | Simonian et al. | |
| 2006/0013735 A1 | 1/2006 | Engelking et al. | |
| 2006/0078724 A1 | 4/2006 | Bhushan et al. | |
| 2006/0147675 A1 | 7/2006 | Nun et al. | |
| 2006/0204738 A1 | 9/2006 | Dubrow et al. | |
| 2006/0240218 A1 | 10/2006 | Parce | |
| 2006/0246226 A1 | 11/2006 | Dai et al. | |
| 2007/0026193 A1 | 2/2007 | Luzinov et al. | |
| 2007/0031639 A1 | 2/2007 | Hsu et al. | |
| 2007/0135602 A1 | 6/2007 | Yamahiro et al. | |
| 2007/0178374 A1 | 8/2007 | Aizenberg et al. | |
| 2007/0207335 A1 | 9/2007 | Karandikar et al. | |
| 2007/0231542 A1 | 10/2007 | Deng et al. | |
| 2007/0282247 A1 | 12/2007 | Desai et al. | |
| 2007/0298216 A1 | 12/2007 | Jing et al. | |
| 2008/0026505 A1 | 1/2008 | Chakrapani | |
| 2008/0085070 A1 | 4/2008 | Hirata et al. | |
| 2008/0118763 A1 | 5/2008 | Balow et al. | |
| 2008/0145631 A1 | 6/2008 | Bhate et al. | |
| 2008/0213461 A1 | 9/2008 | Gill et al. | |
| 2008/0225378 A1 | 9/2008 | Weikert et al. | |
| 2009/0124520 A1 | 5/2009 | Tohidi | |
| 2009/0155609 A1 | 6/2009 | Gentleman et al. | |
| 2009/0185867 A1 | 7/2009 | Masters et al. | |
| 2009/0211735 A1 | 8/2009 | Stenkamp et al. | |
| 2009/0231273 A1 | 9/2009 | Lashina et al. | |
| 2009/0289213 A1 | 11/2009 | Pipper | |
| 2010/0004373 A1 | 1/2010 | Zhu et al. | |
| 2010/0028604 A1 | 2/2010 | Bhushan et al. | |
| 2010/0028615 A1 | 2/2010 | Hwang et al. | |
| 2010/0092621 A1 | 4/2010 | Akutsu et al. | |
| 2010/0098909 A1 | 4/2010 | Reyssat et al. | |
| 2010/0112286 A1 | 5/2010 | Bahadur et al. | |
| 2010/0135949 A1 | 6/2010 | Ou-Yang | |
| 2010/0143620 A1 | 6/2010 | Ajdelsztajn et al. | |
| 2010/0147441 A1 | 6/2010 | Nakagawa et al. | |
| 2010/0151197 A1 | 6/2010 | Gentleman et al. | |
| 2010/0180952 A1 | 7/2010 | Verhelst et al. | |
| 2010/0200094 A1 | 8/2010 | Ermakov | |

(56) References Cited

U.S. PATENT DOCUMENTS

| | | |
|---|---|---|
| 2010/0218517 A1 | 9/2010 | Luther |
| 2010/0229955 A1* | 9/2010 | Bell ................... F17D 1/16 137/13 |
| 2010/0285229 A1 | 11/2010 | Elbahri et al. |
| 2010/0285275 A1 | 11/2010 | Baca et al. |
| 2010/0307922 A1 | 12/2010 | Wu |
| 2010/0330146 A1 | 12/2010 | Chauhan et al. |
| 2010/0330340 A1 | 12/2010 | Rothstein et al. |
| 2011/0003143 A1 | 1/2011 | Sugimoto et al. |
| 2011/0042850 A1 | 2/2011 | Hong et al. |
| 2011/0077172 A1 | 3/2011 | Aizenberg et al. |
| 2011/0094883 A1 | 4/2011 | Ito et al. |
| 2011/0106504 A1 | 5/2011 | Noureldin |
| 2011/0201984 A1 | 8/2011 | Dubrow et al. |
| 2011/0226998 A1 | 9/2011 | Van De Weijer-Wagemans et al. |
| 2011/0240130 A1 | 10/2011 | Den Dulk et al. |
| 2011/0283778 A1 | 11/2011 | Angelescu et al. |
| 2011/0287217 A1 | 11/2011 | Mazumder et al. |
| 2012/0000848 A1 | 1/2012 | Lyons et al. |
| 2012/0000853 A1 | 1/2012 | Tuteja et al. |
| 2012/0036846 A1 | 2/2012 | Aizenberg et al. |
| 2012/0128963 A1 | 5/2012 | Mao et al. |
| 2012/0248020 A1 | 10/2012 | Granick et al. |
| 2013/0003258 A1 | 1/2013 | Xie et al. |
| 2013/0032316 A1* | 2/2013 | Dhiman ............... C09D 5/1681 138/145 |
| 2013/0034695 A1 | 2/2013 | Smith et al. |
| 2013/0062285 A1 | 3/2013 | Hoek et al. |
| 2013/0122225 A1 | 5/2013 | Azimi et al. |
| 2013/0123389 A1 | 5/2013 | Zhu et al. |
| 2013/0146536 A1 | 6/2013 | Tarabara et al. |
| 2013/0220813 A1 | 8/2013 | Anand et al. |
| 2013/0227972 A1 | 9/2013 | Hatton et al. |
| 2013/0251769 A1 | 9/2013 | Smith et al. |
| 2013/0251942 A1 | 9/2013 | Azimi et al. |
| 2013/0251946 A1 | 9/2013 | Azimi et al. |
| 2013/0251952 A1 | 9/2013 | Smith et al. |
| 2013/0302405 A1 | 11/2013 | Takaha et al. |
| 2013/0333789 A1 | 12/2013 | Smith et al. |
| 2013/0335697 A1 | 12/2013 | Smith et al. |
| 2013/0337027 A1 | 12/2013 | Smith et al. |
| 2013/0340840 A1 | 12/2013 | Anand et al. |
| 2014/0141263 A1 | 5/2014 | Jones et al. |
| 2014/0147627 A1 | 5/2014 | Aizenberg et al. |
| 2014/0178611 A1 | 6/2014 | Smith et al. |
| 2014/0290699 A1 | 10/2014 | Bengaluru Subramanyam et al. |
| 2014/0291420 A1 | 10/2014 | Dhiman et al. |
| 2015/0111063 A1 | 4/2015 | Khan et al. |
| 2015/0125575 A1 | 5/2015 | Smith et al. |
| 2015/0179321 A1 | 6/2015 | Kahlil et al. |
| 2015/0306642 A1 | 10/2015 | Smith et al. |
| 2016/0150793 A1 | 6/2016 | Cordero et al. |
| 2016/0296985 A1 | 10/2016 | Dhiman et al. |
| 2017/0144828 A1 | 5/2017 | Smith et al. |
| 2017/0151575 A1 | 6/2017 | Dhiman et al. |
| 2018/0050133 A1 | 2/2018 | Smith et al. |
| 2018/0072895 A1 | 3/2018 | Smith et al. |
| 2018/0161836 A1 | 6/2018 | Anand et al. |
| 2018/0180364 A1 | 6/2018 | Dhiman et al. |
| 2019/0100353 A1 | 4/2019 | Subramanyam et al. |
| 2019/0224695 A1 | 7/2019 | Dhiman et al. |
| 2022/0024682 A1 | 1/2022 | Smith et al. |
| 2022/0126001 A1 | 4/2022 | Smith et al. |
| 2022/0297887 A1 | 9/2022 | Subramanyam et al. |
| 2024/0016985 A1 | 1/2024 | Smith et al. |

FOREIGN PATENT DOCUMENTS

| | | |
|---|---|---|
| CN | 102002298 A | 4/2011 |
| CN | 101269960 B | 5/2011 |
| CN | 102790021 | 11/2012 |
| DE | 19818956 A1 | 11/1998 |
| EP | 0 230 112 A2 | 7/1987 |
| EP | 0 980 747 A2 | 2/2000 |
| EP | 1750018 A2 | 2/2007 |
| EP | 1 892 458 A1 | 2/2008 |
| EP | 2163295 A1 | 3/2013 |
| JP | S60-75236 A | 4/1985 |
| JP | H01-170932 A | 7/1989 |
| JP | H05-240251 A | 9/1993 |
| JP | 2002-120861 | 4/2002 |
| JP | 2004-037764 A | 2/2004 |
| JP | 2006-143988 A | 6/2006 |
| JP | 2007-215620 A | 8/2007 |
| JP | 2007-278090 A | 10/2007 |
| JP | 2008-223003 A | 9/2008 |
| JP | 2008-240910 A | 10/2008 |
| JP | 2009-241943 A | 10/2009 |
| JP | 2010-167929 A | 8/2010 |
| JP | 2011-500150 A | 1/2011 |
| JP | 2011-126080 A | 6/2011 |
| JP | 2013-166811 A | 8/2013 |
| JP | 2013-168399 A | 8/2013 |
| KR | 10-2009-0020008 A | 2/2009 |
| TW | I233968 B | 6/2005 |
| WO | WO 93/17077 A1 | 9/1993 |
| WO | WO 99/36490 A1 | 7/1999 |
| WO | WO 2001/38288 A1 | 5/2001 |
| WO | WO 2002/62568 A2 | 8/2002 |
| WO | WO 2003/13827 A1 | 2/2003 |
| WO | WO 2003/71275 A1 | 8/2003 |
| WO | WO 2003/087604 A1 | 10/2003 |
| WO | WO 2006/017009 A2 | 2/2006 |
| WO | WO 2006/091235 A1 | 8/2006 |
| WO | WO 2006/132892 A2 | 12/2006 |
| WO | WO 2007/019362 A1 | 2/2007 |
| WO | WO 2007/095058 A2 | 8/2007 |
| WO | WO 2008/111603 A1 | 9/2008 |
| WO | WO 2009/009185 A2 | 1/2009 |
| WO | WO 2010/028752 A1 | 3/2010 |
| WO | WO 2010/082710 A1 | 7/2010 |
| WO | WO 2010/096073 A1 | 8/2010 |
| WO | WO 2010/129807 A1 | 11/2010 |
| WO | WO 2011/087458 A1 | 7/2011 |
| WO | WO 2011/143371 A1 | 11/2011 |
| WO | WO 2012/024099 A1 | 2/2012 |
| WO | WO 2012/100099 A2 | 7/2012 |
| WO | WO 2012/100100 A2 | 7/2012 |
| WO | WO 2013/022467 A2 | 2/2013 |
| WO | WO 2013/130118 A1 | 9/2013 |
| WO | WO 2013/141888 A1 | 9/2013 |
| WO | WO 2013/141953 A2 | 9/2013 |
| WO | WO 2013/177579 A2 | 11/2013 |
| WO | WO 2014/123217 A1 | 8/2014 |

OTHER PUBLICATIONS

International Preliminary Report on Patentability (Chapter II) for application PCT/US2014/066227 mailed Feb. 2, 2016.
International Search Report and Written Opinion for application PCT/US2014/066227 mailed Mar. 3, 2015.
International Search Report and Written Opinion for application PCT/US2011/061898 mailed Apr. 24, 2013.
International Search Report and Written Opinion for application PCT/US2012/030370 mailed Oct. 15, 2012.
International Search Report and Written Opinion for application PCT/US2012/042327 mailed May 16, 2013.
International Search Report and Written Opinion for application PCT/US2013/021558 mailed Oct. 11, 2013.
International Search Report and Written Opinion for application PCT/US2013/042771 mailed May 26, 2014.
International Search Report and Written Opinion for application PCT/US2012/042326 mailed Dec. 3, 2012.
International Search Report and Written Opinion for application PCT/US2013/045731 mailed Nov. 12, 2013.
International Search Report and Written Opinion for application PCT/US2014/019532 mailed Nov. 25, 2014.
International Search Report and Written Opinion for application PCT/US2013/070827 mailed Mar. 27, 2014.
International Preliminary Report on Patentability (Chapter II) for application PCT/US2013/070827 mailed Feb. 10, 2015.

(56) References Cited

OTHER PUBLICATIONS

International Search Report and Written Opinion for application PCT/US2011/049187 mailed Jan. 23, 2013.
International Search Report and Written Opinion for application PCT/US2012/065627 mailed Mar. 8, 2013.
International Search Report and Written Opinion for application PCT/US2013/028439 mailed Dec. 5, 2013.
[No Author Listed], Fluorinert Liquids for Electronics Manufacturing. 2003. 3M Corporation. 4 pages.
[No Author Listed], Furaipan curabu (frying pan club). Nov. 2, 20111. Last accessed on Nov. 3, 2016 from <https://www.furaipan.com/kaigi/11/1121.shtml>. 3 pages.
[No Author Listed], How much is left in that container? Consumer reports. 2009 Sept. Last accessed on May 2, 20151 at <http://www.consumerreports.org/cro/magazine-archive/Sep. 2009/personal-finance/good-to-the-last-drop/overview/good-to-the-last-drop-ov.htm?view=print>. 2 pages.
[No Author Listed], LiquiGlide gets it all out. Packaging News. Mar. 3, 20150. Last accessed on May 21, 2015 at <http://www.packagingnews.com.au/news/liquiglide-gets-it-all-out>. 4 pages.
[No Author Listed], LiquiGlide Lets Food Slide Out of Packaging with Ease. Food Processing. 2014. Last accessed on May 2, 20151 at <http://www.foodprocessing.com/vendors/products/2014/liquiglide-lets-food-slide-out-of-packaging-with-ease>. 6 pages.
[No Author Listed], Liquiglide's Coatings Ensure Evacuation of Viscous Formulations. Beauty Packaging. Aug. 4, 2014. Last accessed on May 2, 20151 at <http://www.beautypackaging.com/issues/2014-08/view_design-center/liquiglides-coatings-ensure-evacuation-of-viscous-formulations/>. 1 page.
[No Author Listed], Scientists Develop Super-Slippery Material. Slashdot. Original Nov. 1, 20114 post with public comments. Last accessed on Nov. 3, 2016 from <https://science.slashdot.org/story/11/11/14/0437204/scientists-develop-super-slippery-material>. 11 pages.
[No Author Listed], Super Slippery surface processing Harvard University Development. Science SRAD. Original Nov. 17, 2011 post with public comments. Last accessed on Nov. 3, 2016 from <http://science.srad.jp/story/11/11/17/0037255/>. 8 pages.
[No Author Listed], What is fluid? Heishin Ltd. 2014. Last accessed on Nov. 3, 2016 from <http://www.mohno-pump.co.jp/learning/manabiya/c2b.html>. 2 pages.
Allain et al., A New Method for Contact-Angle Measurements of Sessile Drops. Journal of Calloid and Interface Science. Sep. 1985;107(1):5-13.
Anand et al., Enhanced condensation on lubricant-impregnated nanotextured surfaces. ACS Nano. Nov. 27, 2012;6(11):10122-9. doi: 10.1021/nn303687y.
Antonini et al., Water drops dancing on ice: how sublimation leads to drop rebound. Phys Rev Lett. Jul. 5, 2013;111(1):014501-1-5.
Arkles, Hydrophobicity, Hydrophilicity and Silanes. Paint and Coatings Industry. Oct. 1, 2006;114-35.
Ashkin et al., Optical levitation by radiation pressure. Applied Physics Letters. 1971;19(8):283-5.
Ashkin et al., Optical levitation of liquid drop by radiation pressure. Science. 1975;187(4181):1073-5.
Avedisian et al., Leidenfrost boiling of methanol droplets on hot porous/ceramic surfaces. International Journal of Heat and Mass Transfer. 1987;30(2):379-93.
Azimi et al., Hydrophobicity of rare-earth oxide ceramics. Nat Mater. Apr. 2013;12(4):315-20. doi: 10.1038/nmat3545. Epub Jan. 20, 2013.
Baier et al., Propulsion Mechanisms for Leidenfrost Solids on Ratchet Surfaces. arXiv preprint arXiv:1208.5721 (2012). 5 pages.
Bargir et al., The use of contact angle measurements to estimate the adhesion propensity of calcium carbonate to solid substrates in water. Applied Surface Science. 2009;255:4873-9.
Barnes, The Potential for Monolayers to Reduce the Evaporation of Water from Large Water Storages. Agricultural Water Management. 2008;95(4):339-53.

Bauer et al., The insect-trapping rim of Nepenthes pitchers: surface structure and function. Plant Signaling & Behavior. 2009;4(11):1019-23.
Beaugnon et al., Dynamics of magnetically levitated droplets. Physica B. 2001;294-295:715-20.
Betz et al., Do surfaces with mixed hydrophilic and hydrophobic areas enhance pool boiling? Applied Physics Letters. 2010;97:141909-1-3.
Biance et al., Leidenfrost drops. Physics of Fluids. 2003;15(6):1632-7.
Bico et al., Pearl drops. Europhysics Letters. 1999;47(2):220-6.
Bird et al., Reducing the contact time of a bouncing drop. Nature. Nov. 21, 2013;503(7476):385-8. doi: 10.1038/nature12740.
Blossey, Self-cleaning surfaces—Virtual realities. Nature Materials. 2003;2(5):301-6.
Bohn et al., Insect aquaplaning: Nepenthes pitcher plants capture prey with the peristome, a fully wettable water-lubricated anisotropic surface. Proc Natl Acad Sci U S A. Sep. 28, 2004;101(39):14138-43.
Burton et al., Geometry of the Vapor Layer Under a Leidenfrost Drop. Physical Review Letters. 2012;109(7):074301. 4 pages.
Cao et al., Anti-Icing Superhydrophobic Coatings. Langmuir Letter. 2009;25(21):12444-8.
Cassie et al., Wettability of porous surfaces. Transactions of the Faraday Society. 1944;40:546-51.
Celestini et al., Take Off of Small Leidenfrost Droplets. Physical Review Letters. 2012;109(3):034501-1-5.
Chandra et al., Leidenfrost evaporation of liquid nitrogen droplets. Transactions of the ASME: Journal of Heat Transfer. 1994;116(4):999-1006.
Chandra et al., Observations of droplet impingement on a ceramic porous surface. International Journal of Heat and Mass Transfer. 1992;35(10):2377-88.
Chaudhuri et al., Dynamic contact angles on PTFE surface by aqueous surfactant solution in the absence and presence of electrolytes. J Colloid Interface Sci. Sep. 15, 2009;337(2):555-62. doi: 10.1016/j.jcis.2009.05.033. Epub May 21, 2009.
Chen et al., A Wettability Switchable Surface by Microscale Surface Morphology Change. Journal of Micromechanics & Microengineering. Institute of Physics Publishing. 2007;17(3):489-95.
Cummings et al., Oscillations of magnetically levitated aspherical droplets. Journal of Fluid Mechanics. 1991;224:395-416.
Deng et al., Nonwetting of impinging droplets on textured surfaces. Applied Physics Letters. 2009;94(13):133109-1-3.
Dickerson, Incredible new invention has solved a universally annoying problem. Business Insider. Mar. 23, 2015. Accessed on May 2, 20151 at <http://www.businessinsider.com/liquiglide-nonstick-coating-on-bottles-2015-3>. 4 pages.
Eck et al., Growth and thermal properties of ultrathin cerium oxide layers on RH(111). Surface Science. 2002;520:173-85.
Elbahri et al., Anti-lotus effect for nanostructuring at the leidenfrost temperature. Advance Materials. 2007;19(9):1262-6.
Feng et al., Design and creation of superwetting/antiwetting surfaces. Advanced Materials. 2006;18(23):3063-78.
Fondecave et al., Polymers as Dewetting Agents. Macromolecules. 1998;31:9305-15.
Fujimoto et al., Deformation and rebounding processes of a water droplet impinging on a flat surface above Leidenfrost temperature. Journal of Fluids Engineering. Transactions of the ASME—Journal of Fluids Engineering. 1996;118(1):142-9.
Furmidge, Studies at Phase Interfaces. Journal of Colloid Science. 1962;17:309-24.
Gao et al., Artificial lotus leaf prepared using a 1945 patent and a commercial textile. Langmuir. 2006;22(14):5998-6000.
Goldshtik et al., A liquid drop on an air cushion as an analogue of Leidenfrost boiling. Journal of Fluid Mechanics. 1986;166:1-20.
Good, Contact angle, wetting and adhesion: a critical review. J. Adhesion Sci. Technol. 1992;6(12):1269-302.
Grace, Energy from Gas Hydrates: Assessing the Opportunities and Challenges for Canada. Council of Canadian Academies. Jul. 2008. 8 pages.

(56) References Cited

OTHER PUBLICATIONS

Gradeck et al., Heat transfer for Leidenfrost drops bouncing onto hot surface. Experimental Thermal and Fluid Science. 2013;47:14-25.
Hashmi et al., Leidenfrost levitation: beyond droplets. Sci Rep. 2012;2:797. doi: 10.1038/srep00797. 4 pages.
Hejazi et al., Wetting Transition in Two-, Three-, and Four-Phase Systems. Langmuir. 2012;28:2173-80.
Hirano, A study of Burning of Iron Fryingpan in Cooking. Journal of Home Economics of Japan. 1977;28(6):398-402.
Holden et al., The Use of Organic Coating to Promote Dropwise Condensation of Steam. Journal of Heat Transfer. 1987;109:768-74.
Iwasa et al., Electromaglev—Magnetic levitation of superconducting disc with a DC field generated by electromagnets: Part 1. Theoretical and experimental results on operating modes, lift-to-weight ratio, and suspension stiffness. Cryogenics. 1997;37(12):807-16.
Jung et al., Are Superhydrophobic Surfaces Best for Icephobicity? Langmuir. 2011;27(6):3059-66.
Kazi et al., Mineral Scale Formation and Mitigation on Metals and a Polymeric Heat Exchanger Surface. Applied Thermal Engineering. 2010;30:2236-42.
Kazi, Heat Exchangers—Basics Design Applications. Chapter 19—Fouling and Fouling Mitigation on Heat Exchanger Surfaces. InTech. Ed. Jovan Mitrovic. Mar. 2012:507-32.
Kim et al., Hierarchical or not? Effect of the length scale and hierarchy of the surface roughness on omniphobicity of lubricant-infused substrates. Nano Letters. 2013;13(4):1793-9.
Kim et al., Levitation Time Measurement of Water Drops on the Surface of Liquid Nitrogen. Journal of the Korean Physical Society. Jun. 2011;58(6):1628-32.
Kim, Floating Phenomenon of a Water Drop on the Surface of Liquid Nitrogen. Journal of the Korean Physical Society. Oct. 2006;49(4):L1335-8.
King, Mit Bottle Coating Offers Promising Solution to Product Waste. Sustainable Brands. Jul. 9, 2012. Accessed on May 21, 2015 at <http://www.sustainablebrands.com/new_and_views/articles/mit-bottle-coating-offers-promising-solution-product-waste>. 2 pages.
Kulinich et al., Ice Adhesion on Super-Hydrophobic Surfaces. Applied Surface Science. 2009;225:8153-7.
Lafuma et al., Slippery Pre-Suffused Surfaces. EPL. 2011;96:56001-1-4.
Lagubeau et al., Leidenfrost on a ratchet. Nature Physics. 2011;7(5):395-8.
Lee et al., Dynamic Wetting and Spreading Characteristics of a Liquid Droplet Impinging on Hydrophobic Textured Surfaces. Langmuir. 2011;27:6565-73.
Leidenfrost, On the fixation of water in diverse fire. International Journal of Heat and Mass Transfer. 1966;9(11):1153-66.
Li et al., Dynamic Behavior of the Water Droplet Impact on a Textured Hydrophobic/Superhydrophobic Surface: The Effect of the Remaining Liquid Film Arising on the Pillars' Tops on the Contact Time. Langmuir. 2010;26(7):4831-8.
Linke et al., Self-propelled leidenfrost droplets. Physical Review Letters. 2006;96(15):154502-1-4.
Liu et al., Extreme wettability and tunable adhesion: biomimicking beyond nature? Soft Matter. 2012;8:2070-86.
Liu et al., Metallic Surfaces with Special Wettability. Nanoscale. 2011;3:825-38.
Marcus, Ions in Water and Biphysical Implications. 4.2: Surface Between Water and Another Liquid. 2012. p. 147. Table 4.1.
Marin et al., Capillary droplets on Leidenfrost micro-ratchets. arXiv preprint. arXiv:1210.4978. 2012. 9 pages.
Masubuchi, Interesting Rheology. Gijutsuhyoronsha. Jul. 2, 20105. pp. 104-6.
Matolin et al., Growth of ultra-thin cerium oxide layers on Cu(111). Surface Science. 2007;254:153-5.
Meuler et al., Exploiting Topographical Texture to Impact Icephobicity. ACS Nano. 2010;4(12):7048-52.
Mills, Pillow lavas and the Leidenfrost effect. Journal of the Geological Society. 1984;141(1):183-6.
Mishchenko et al., Design of ice-free nanostructured surfaces based on repulsion of impacting water droplets. ACS Nano. 2010;4(12):7699-707.
Mullins et al., Ordered cerium oxide thin films grown on Ru(0001) and Ni(111). Surface Science. 1999;429:186-98.
Nosonovsky et al., Multiscale effects and capillary interactions in functional biomimetic surfaces for energy conversion and green engineering. Phil. Trans. R. Soc. A. 2009;367:1511-39.
Onda et al., Super-water-repellent fractal surfaces. Langmuir. 1996;12(9):2125-7.
Ou et al., Laminar drag reduction in microchannels using ultrahydrophobic surfaces. Physics of Fluids. 2004;16(12):4635-43.
Park et al., A Numerical Study of the Effects of Superhydrophobic Surface on Skin-Friction Drag in Turbulent Channel Flow. Phys. Fluids. 2013;25:110815-1-11.
Piroird et al., Magnetic control of Leidenfrost drops. Physical Review E—Statistical, Nonlinear, and Soft Matter Physics. 2012:85(5):056311-1-4.
Pozzato et al., Superhydrophobic surfaces fabricated by nanoimprint lithography. Microelectronic Engineering. 2006;83:884-88.
Prat et al., On the effect of surface roughness on the vapor flow under Leidenfrost-Levitated droplets. Journal of Fluids Engineering. Transactions of the ASME—Journal of Fluids Engineering. 1995;117(3):519-25.
Quéré et al., Surfing the hot spot. Nature Materials. 2006;5(6):429-30.
Quéré, Leidenfrost dynamics. Annu. Rev. Fluid Mech. 2013:197-215.
Quere, Non-sticking drops. Institute of Physics Publishing. Rep. Prog. Phys. 2005;68(11):2495-532.
Rausch et al., On the characteristics of Ion Implanted Metallic Surfaces Inducing Dropwise Condensation of Steam. Langmuir. 2010;26(8):5971-5.
Reyssat et al., Bouncing transitions on microtextured materials. Europhysics Letters. 2006;74(2):306-12.
Reyssat et al., Dynamical superhydrophobicity. Faraday Discussions. 2010;146:19-33.
Richard et al., Contact time of a bouncing drop. Nature. Jun. 20, 2002;417(6891):811-2.
Roosen et al., Optical levitation by means of two horizontal laser beams: a theoretical and experimental study. Physics Letters. 1976;59A(1):6-8.
Rothstein, Slip on superhydrophobic surfaces. Annual Review of Fluid Mechanics. 2010;42(1):89-109.
Rykaczewski et al., Mechanism of frost formation on lubricant-impregnated surfaces. Langmuir. Apr. 30, 2013;29(17):5230-8. doi: 10.1021/la400801s.
Santos et al., Modified Stainless Steel Surfaces Targeted to Reduce Fouling. J. Food Engineering. 2004;64:63-79.
Schierbaum et al., Ordered ultra-thin cerium oxide overlayers on Pt(111) single crystal surfaces studied by LEED and XPS. Surface Science. 1998;399:29-38.
Seiwert et al., Coating of a Textured Solid. J. Fluid Mech. 2011;669:55-63.
Sekeroglu et al., Transport of a soft cargo on a nanoscale ratchet. Applied Physics Letters. 2011;99(6):063703-1-3.
Sloan, Jr., Fundamental Principles and Applications of Natural Gas Hydrates. Nature Publishing Group. 2003:353-9.
Smith et al., Droplet Mobility on Lubricant-Impregnated Surfaces. Soft Matter. 2013;9:1772-80.
Smith, Liquid-encapsulating surfaces: overcoming the limitations of superhydrophobic surfaces for robust non-wetting and anti-icing surfaces. Bulleting of the American Physical Society. 2011. Abstract Only.
Snoeijer et al., Maximum size of drops levitated by an air cushion. Physical Review E—Statistical, Nonlinear, and Soft Matter Physics. 2009;79(3). 13 pages.
Song et al., Superhydrophobic Surfaces Produced by Applying a Self-Assembled Monolyaer to Silicon Micro/Nano-Textured Surfaces. Nano Research. 2009;2:143-50.

(56) References Cited

OTHER PUBLICATIONS

Song et al., Vitrification and levitation of a liquid droplet on liquid nitrogen. PNAS Early Edition. 2010:1-5.
Sum et al., Clathrate Hydrates: From Laboratory Science to Engineering Practice. American Chemical Society Ind. Eng. Chem. Res. Jul. 22, 2009;48(16):7457-65.
Sutara et al., Epitaxial growth of continuous CeO2(111) ultra-thin films on Cu(111). Thin Solid Films. 2008;516:6120-4.
Trinh et al., The dynamics of ultrasonically levitated drops in an electric field. Physics of Fluids. 1996;8(1)43-61.
Tropmann et al., Completely superhydrophobic PDMS surfaces for microfluidics. Langmuir. Jun. 5, 2012;28(22):8292-5. doi: 10.1021/la301283m. Epub May 21, 2012.
Tuteja et al., Designing superoleophobic surfaces. Science. 2007;318(5856):1618-22.
Tuteja et al., Robust omniphobic surfaces. Proc Natl Acad Sci U S A. Nov. 25, 2008;105(47):18200-5. doi: 10.1073/pnas.0804872105.
Vakarelski et al., Drag reduction by leidenfrost vapor layers. Physical Review Letters. 2011;106(21):214501-1-4.
Vakarelski et al., Stabilization of Leidenfrost vapour layer by textured superhydrophobic surfaces. Nature. 2012;489(7415):274-7.
Varanasi et al., Frost formation and ice adhesion on superhydrophobic surfaces. Applied Physics Letters. 2010;97(23):234102-1-3.
Varanasi et al., Spatial Control in the Heterogeneous Nucleation of Water. Applied Physics Letters. 2009;95:094101-01-03.
Weber et al., Aero-acoustic levitation: A method for containerless liquid-phase processing at high temperatures. Review of Scientific Instruments. 1994;65(2):456-65.
Weickgenannt et al., Inverse-Leidenfrost phenomenon on nanofiber mats on hot surfaces. Physical Review E—Statistical, Nonlinear, and Soft Matter Physics. 2011;84(3):036310-1-9.
Weilert et al., Magnetic levitation and noncoalescence of liquid helium. Physical Review Letters. 1996;77(23):4840-3.
Welter et al., Acoustically levitated droplets—A new tool for micro and trace analysis. Fresenius Journal of Analytical Chemistry. 1997;357(3):345-50.
Wenzel, Resistance of Solid Surfaces to Wetting by Water. Industrial & Engineering Chemistry. 1936;28(8):988-94.
Wong et al., Bioinspired Self-Repairing Slippery Surfaces with Pressure-Stable Omniphobicity. Nature. 2011;477(7365):443-7.
Wong et al., Bioinspired Self-Repairing Slippery Surfaces with Pressure-Stable Omniphobicity. Nature. 2011;477(7365):443-7. Supplementary Information Included.
Würger, Leidenfrost gas ratchets driven by thermal creep. Physical Review Letters. 2011;107(16). 4 pages.
Yarin et al., On the acoustic levitation of droplets. Journal of Fluid Mechanics. 1998;356:65-91.
Yasuda et al., Levitation of metallic melt by using the simultaneous imposition of the alternating and the static magnetic fields. Journal of Crystal Growth. 2004;260(3-4):475-85.
Yu et al., Containerless solidification of oxide material using an electrostatic levitation furnace in microgravity. Journal of Crystal Growth. 2001;231(4):568-76.
Zhao et al., Dropwise condensation of Steam on Ion Implanted Condenser Surfaces. Heat Recovery Systems & CHP. 1994;14(5):525-34.
Dhiman et al., Rupture of thin films formed during droplet impact. Pro Royal Society. Apr. 2010;466(2116):1229-1245.

* cited by examiner

FIGs. 1A-J

| Interface | Configuration | Total interface energy per unit area | Equivalent Criteria | | |
|---|---|---|---|---|---|
| Oil-Solid-Air | A1 Dry | $E_{A1} = r\gamma_{oa}$ | $E_{A1} < E_{A2}, E_{A3}$ | $S_{os(a)} < -\gamma_{oa}\left(\frac{r-\phi}{1-\phi}\right)$ | $\theta_{os(a)} > \theta^*$ |
| | A2 Impregnated, emerged | $E_{A2} = (r-\phi)\gamma_{os} + \phi\gamma_{oa} + (1-\phi)\gamma_{sa}$ | $E_{A2} < E_{A1}, E_{A3}$ | $-\gamma_{oa}\left(\frac{r-\phi}{1-\phi}\right) < S_{os(a)} < 0$ | $0 < \theta_{os(a)} < \theta^*$ |
| | A3 Encapsulated | $E_{A3} = \gamma_{os} + r\gamma_{oa}$ | $E_{A3} < E_{A1}, E_{A2}$ | $S_{os(a)} \geq 0$ | $\theta_{os(a)} = 0$ |
| Oil-Solid-Water | W1 Impaled | $E_{W1} = r\gamma_{ow}$ | $E_{W1} < E_{W2}, E_{W3}$ | $S_{os(w)} < -\gamma_{ow}\left(\frac{r-\phi}{1-\phi}\right)$ | $\theta_{os(w)} > \theta^*$ |
| | W2 Impregnated, emerged | $E_{W2} = (r-\phi)\gamma_{os} + \phi\gamma_{ow} + (1-\phi)\gamma_{sw}$ | $E_{W2} < E_{W1}, E_{W3}$ | $-\gamma_{ow}\left(\frac{r-\phi}{1-\phi}\right) < S_{os(w)} < 0$ | $0 < \theta_{os(w)} < \theta^*$ |
| | W3 Encapsulated | $E_{W3} = \gamma_{os} + r\gamma_{ow}$ | $E_{W3} < E_{W1}, E_{W2}$ | $S_{os(w)} \geq 0$ | $\theta_{os(w)} = 0$ |

EQUATIONS ENLARGED FOR CLARITY

NONWETTED STATE 1

$\theta^*_{os(v)} = 0$
$\theta^*_{os(w)} = 0$
$\theta_{os(v)} = 0$
$\theta_{os(w)} = 0$

NONWETTED STATE 3

$\theta^*_{os(v)} = 0$
$\theta^*_{os(w)} = 0$
$\theta_{os(v)} = 0$
$\theta_{os(w)} > 0$

IMPALED STATE 1

$\theta^*_{os(v)} = 0$
$\theta^*_{os(w)} > 0$
$\theta_{os(v)} = 0$
$\theta_{os(w)} > 0$

NONWETTED STATE 2

$\theta^*_{os(v)} = 0$
$\theta^*_{os(w)} = 0$
$\theta_{os(v)} > 0$
$\theta_{os(w)} > 0$

NONWETTED STATE 4

$\theta^*_{os(v)} = 0$
$\theta_{os(v)} > 0$
$\theta^*_{os(w)} = 0$
$\theta_{os(w)} = 0$

IMPALED STATE 2

$\theta^*_{os(v)} = 0$
$\theta_{os(v)} > 0$
$\theta^*_{os(w)} > 0$
$\theta_{os(w)} > 0$

FIG. 5

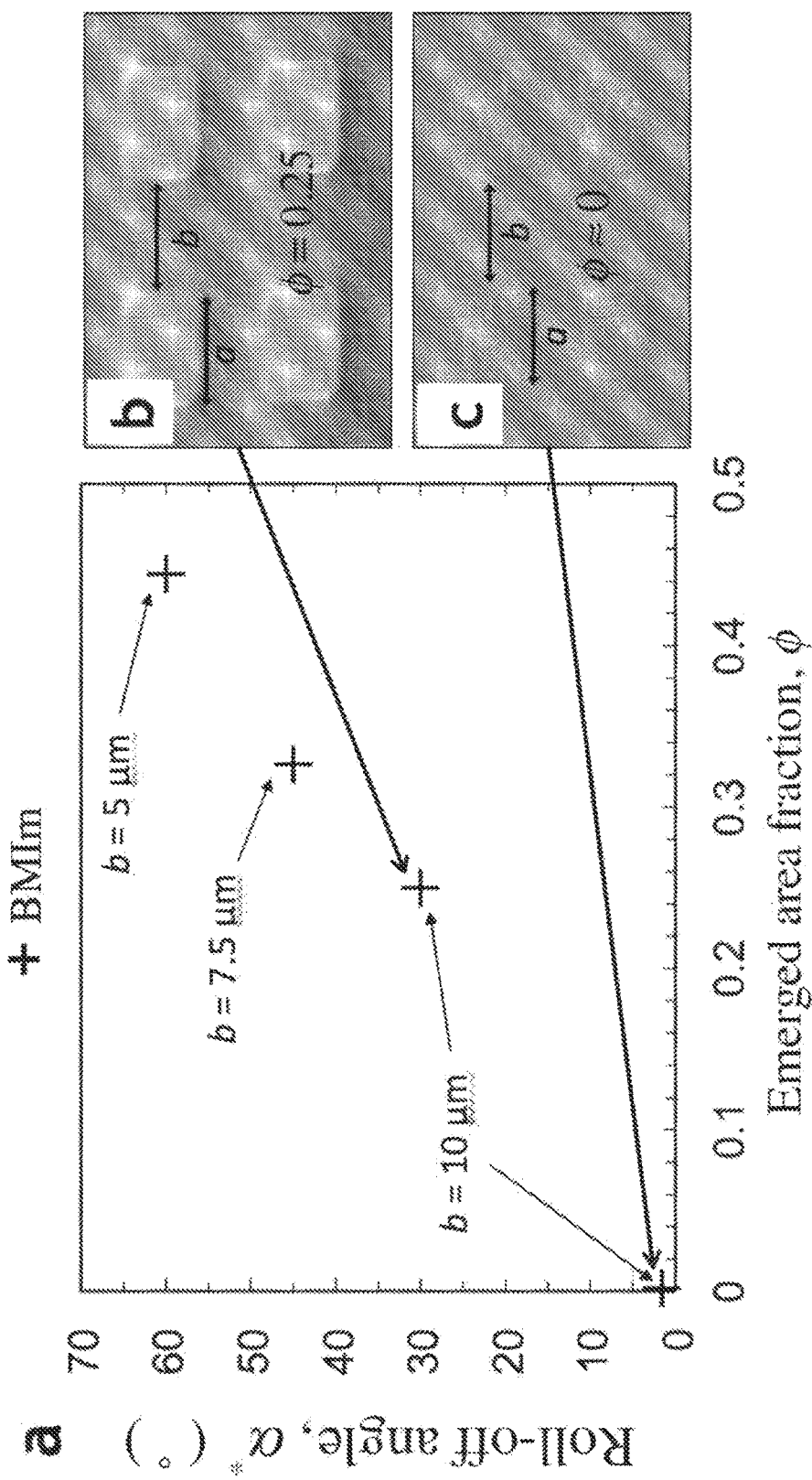
FIGs. 6A-C

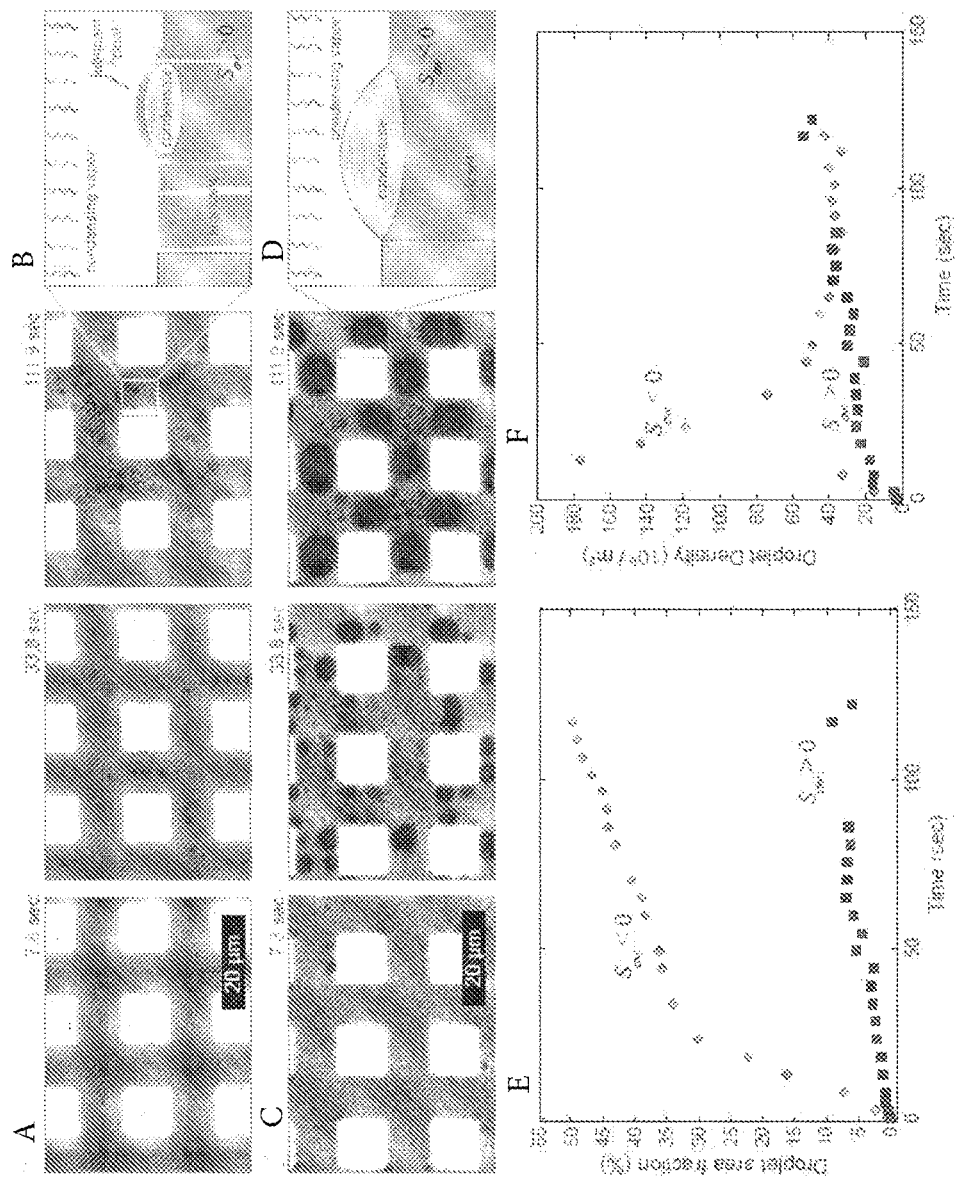
FIGs. 7A-F

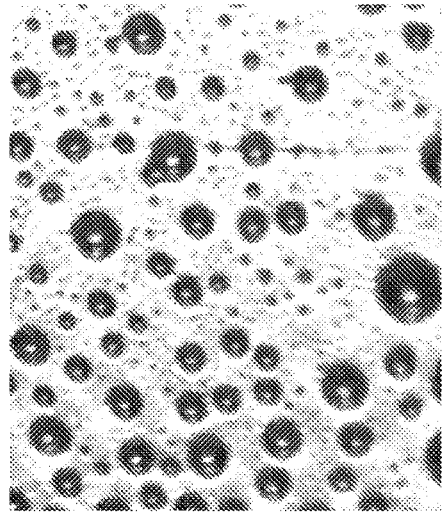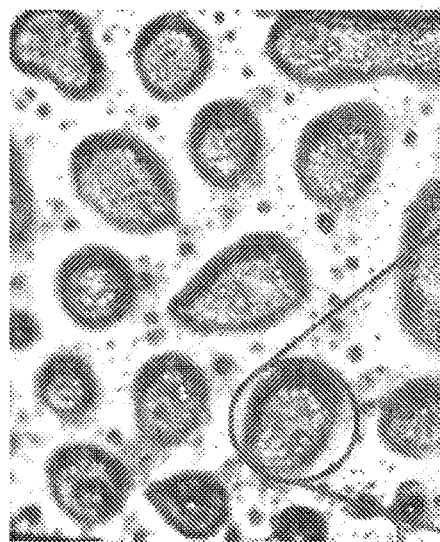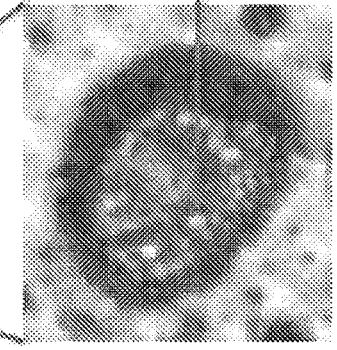
Fig. 8

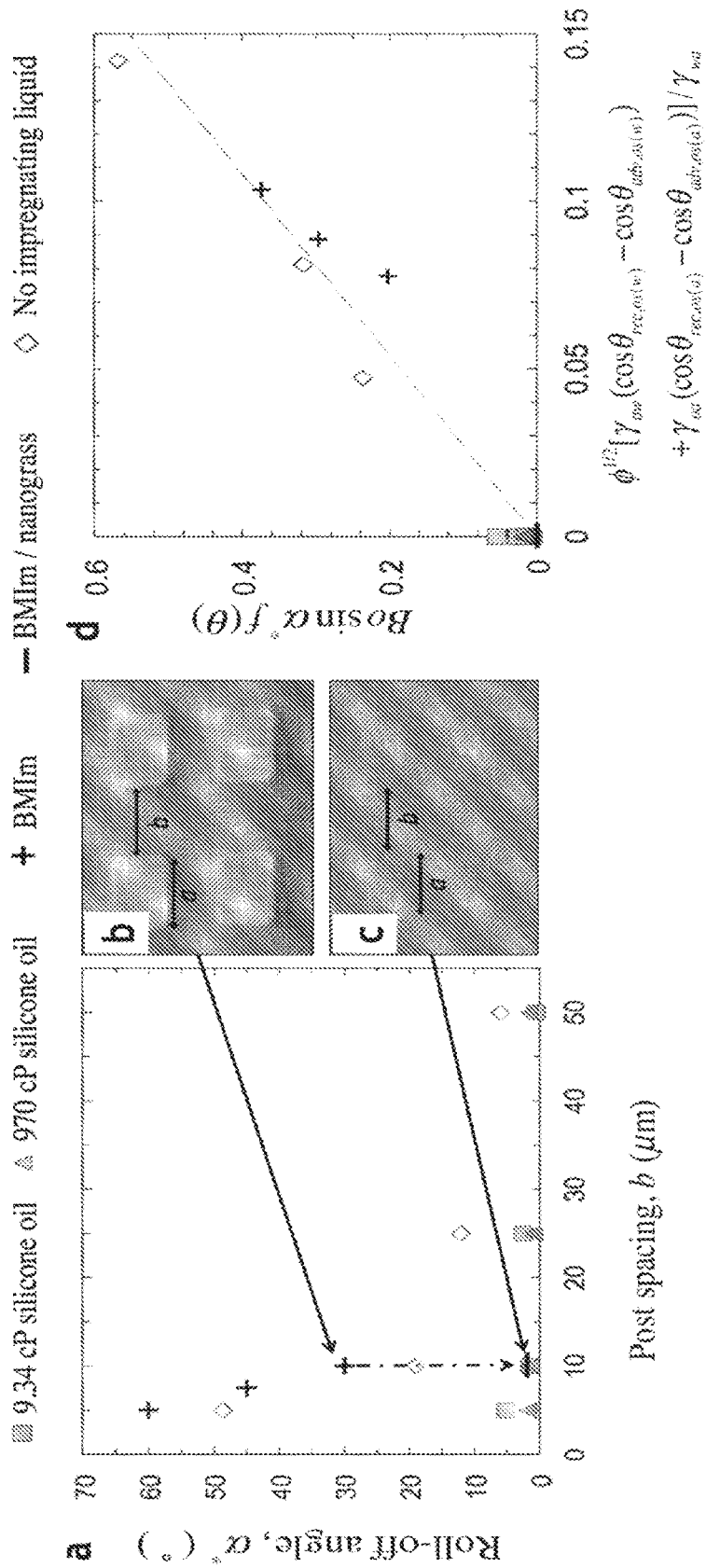
FIGs. 11A-D

APPARATUS AND METHODS EMPLOYING LIQUID-IMPREGNATED SURFACES

RELATED APPLICATIONS

This application is a continuation of U.S. Non-Provisional application Ser. No. 14/443,620, filed May 18, 2015, which is a National Stage filing under 35 U.S.C. § 371 of International Patent Application No. PCT/US2013/070827, filed on Nov. 19, 2013, which claims priority to U.S. Provisional Patent Application No. 61/827,444, filed May 24, 2013 and to U.S. Provisional Patent Application No. 61/728,219, filed Nov. 19, 2012, each of which are hereby incorporated by reference in their entireties for all purposes.

TECHNICAL FIELD

This invention relates generally to non-wetting and low adhesion surfaces. More particularly, in certain embodiments, the invention relates to non-wetting, liquid-impregnated surfaces that are engineered to eliminate pinning and/or to either avoid or induce cloaking.

BACKGROUND

The advent of micro/nano-engineered surfaces in the last decade has opened up new techniques for enhancing a wide variety of physical phenomena in thermofluids sciences. For example, the use of micro/nano surface textures has provided nonwetting surfaces capable of achieving less viscous drag, reduced adhesion to ice and other materials, self-cleaning, and water repellency. These improvements result generally from diminished contact (i.e., less wetting) between the solid surfaces and adjacent liquids.

One type of non-wetting surface of interest is a superhydrophobic surface. In general, a superhydrophobic surface includes micro/nano-scale roughness on an intrinsically hydrophobic surface, such as a hydrophobic coating. Superhydrophobic surfaces resist contact with water by virtue of an air-water interface within the micro/nano surface textures.

One of the drawbacks of existing non-wetting surfaces (e.g., superhydrophobic, superoleophobic, and supermetallophobic surfaces) is that they are susceptible to impalement, which destroys the non-wetting capabilities of the surface. Impalement occurs when an impinging liquid (e.g., a liquid droplet or liquid stream) displaces the air entrained within the surface textures. Previous efforts to prevent impalement have focused on reducing surface texture dimensions from micro-scale to nano-scale.

Although not well recognized in previous studies of liquid-impregnated surfaces, the impregnating liquid may spread over and "cloak" the contacting liquid (e.g., water droplets) on the surface. For example, cloaking can cause the progressive loss of impregnating liquid through entrainment in the water droplets as they are shed from the surface.

Frost formation is another problem affecting a large variety of industries, including transportation, power generation, construction, and agriculture. The effects of frosting may lead to downed power lines, damaged crops, and stalled aircrafts. Moreover, frost and ice accumulation significantly decreases the performance of ships, wind turbines, and HVAC systems. Currently used active chemical, thermal, and mechanical techniques of ice removal are time consuming and costly in operation. Development of passive methods preventing frost and ice accretion is highly desirable. Hydrophobic surfaces have a high energy barrier for ice nucleation and low ice adhesion strength and, if properly roughened on the nano- and/or micro-scales, can repel impact of supercooled water droplets. However, the anti-icing properties of hydrophobic as well as superhydrophobic surfaces are negated once the surfaces are frosted. Frost formation and ice adhesion can also be reduced by addition of a liquid or grease onto the working surface. For example, ice adhesion to aircraft surfaces is significantly reduced through application of silicone grease, and frost formation can be prevented on exterior of freezers and heat exchangers coated with a 100 μm porous layer infused with propylene glycol antifreeze. However, in both of these cases the non-solid phases are sacrificial and can leak into the surroundings causing significant environmental problems.

There is a need for non-wetting surfaces that are robust and/or deliver optimal non-wetting properties and resist frost formation.

SUMMARY OF THE INVENTION

Described herein are non-wetting surfaces that include a liquid impregnated within a matrix of micro/nano-engineered features on the surface, or a liquid filling pores or other tiny wells on the surface. In certain embodiments, compared to previous non-wetting surfaces, which include a gas (e.g., air) entrained within the surface textures, these liquid-impregnated surfaces are resistant to impalement and frost formation, and are therefore more robust.

Impregnating fluids that cover the tops of the matrix of solid features offer a non-wetting benefit. However, at equilibrium, the impregnating liquid may not cover the tops of solid features (e.g., microposts or nanograss) of the surface without being continually replenished. Furthermore, while certain impregnating fluids do cover the tops of solid features, offering a non-wetting benefit, they often exhibit cloaking, and the impregnating fluid is depleted unless replenished.

It is discovered that liquid-impregnated surfaces can be engineered to provide resistance to impalement and to provide non-wettability, without requiring replenishment of impregnating fluid to make up for liquid lost to cloaking, and without requiring replenishment of impregnating liquid to maintain coverage over the tops of the solid features.

In one aspect, the invention is directed to an article comprising a liquid-impregnated surface, said surface comprising an impregnating liquid and a matrix of solid features spaced sufficiently close to stably contain the impregnating liquid therebetween or therewithin, wherein one or both of the following holds: (i) $0 < \phi \leq 0.25$, where $\phi$ is a representative fraction of the projected surface area of the liquid-impregnated surface corresponding to non-submerged solid (i.e., non-submerged by the impregnating liquid, e.g., can be "non-submerged" and still in contact with water) at equilibrium (e.g., where equilibrium can encompass pseudo-equilibrium); and (ii) $S_{ow(v)} < 0$, where $S_{ow(v)}$ is spreading coefficient, defined as $\gamma_{wv} - \gamma_{wo} - \gamma_{ov}$, where $\gamma$ is the interfacial tension between the two phases designated by subscripts, said subscripts selected from w, v, and o, where w is water, v is vapor phase in contact with the surface (e.g., air), and o is the impregnating liquid.

In some embodiments, $0 < \phi \leq 0.25$, or $0.01 < \phi \leq 0.25$, or $0.05 < \phi \leq 0.25$. In some embodiments, $S_{ow(v)} < 0$.

In some embodiments, the impregnating liquid comprises at least one member selected from the group consisting of silicone oil, propylene glycol dicaprylate/dicaprate, perfluoropolyether (PFPE), polyalphaolefin (PAO), synthetic hydrocarbon cooligomer, fluorinated polysiloxane, propylene glycol, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, and amyl phthalate.

In some embodiments, the solid features comprise at least one member selected from the group consisting of a polymeric solid, a ceramic solid, a fluorinated solid, an intermetallic solid, and a composite solid. In some embodiments, the solid features comprise a chemically modified surface, coated surface, surface with a bonded monolayer. In some embodiments, the solid features define at least one member selected from the group consisting of pores, cavities, wells, interconnected pores, and interconnected cavities. In some embodiments, the solid features comprise at least one member selected from the group consisting of posts, nanoneedles, nanograss, substantially spherical particles, and amorphous particles. In some embodiments, the solid features have a rough surface (e.g., the solid features have a surface roughness >50 nm, >100 nm, e.g., and also <1 μm). In some embodiments, the rough surface provides stable impregnation of liquid therebetween or therewithin, such that $\theta_{os(v),receding} < \theta_c$, where $\theta_c$ is critical contact angle.

In some embodiments, the liquid-impregnated surface is configured such that water droplets contacting the surface are not pinned or impaled on the surface and have a roll-off angle α of less than 40°. In some embodiments, the water droplets have a roll-off angle α of less than 35°, less than 30°, less than 25°, or less than 20°.

In another aspect, the invention is directed to an article comprising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(w),receding} = 0$; and (ii) $\theta_{os(v),receding} = 0$ and $\theta_{os(w),receding} = 0$, where $\theta_{os(w),receding}$ is receding contact angle of the impregnating liquid (e.g., oil, subscript 'o') on the surface (subscript 's') in the presence of water (subscript 'w'), and where $\theta_{os(v),receding}$ is receding contact angle of the impregnating liquid (e.g., oil, subscript 'o') on the surface (subscript 's') in the presence of vapor phase (subscript 'v', e.g., air).

In another aspect, the invention is directed to a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(v),receding} > 0$; and (ii) $\theta_{os(w),receding} > 0$, where $\theta_{os(v),receding}$ is receding contact angle of the impregnating liquid (e.g., oil, subscript 'o') on the surface (subscript 's') in the presence of vapor phase (subscript 'v', e.g., air), and where $\theta_{os(w),receding}$ is receding contact angle of the impregnating liquid (e.g., oil, subscript 'o') on the surface (subscript 's') in the presence of water (subscript 'w').

In some embodiments, both $\theta_{os(v),receding} > 0$ and $\theta_{os(w),receding} > 0$. In some embodiments, one or both of the following holds: (i) $\theta_{os(v),receding} < \theta_c$; and (ii) $\theta_{os(w),receding} < \theta_c$, where $\theta_c$ is critical contact angle. In some embodiments, one or both of the following holds: (i) $\theta_{os(v),receding} < \theta^*_c$; and (ii) $\theta_{os(w),receding} < \theta^*_c$, where $\theta^*_c = \cos^{-1}(1/r)$, and where r is roughness of the solid portion of the surface.

In some embodiments, the article is a member selected from the group consisting of a pipeline, a steam turbine part, a gas turbine part, an aircraft part, a wind turbine part, eyeglasses, a mirror, a power transmission line, a container, a windshield, an engine part, a nozzle, a tube, or a portion or coating thereof.

In another aspect, the invention is directed to an article comprising an interior surface, said article being at least partially enclosed (e.g., the article is an oil pipeline, other pipeline, consumer product container, other container) and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin, wherein the impregnating liquid comprises water (having viscosity $\mu_2$).

In some embodiments, $\mu_1/\mu_2 > 1$. In some embodiments, $\mu_1/\mu_2 > 0.1$. In some embodiments, $(h/R)(\mu_1/\mu_2) > 0.1$ (where h is average height of the solid features and R is the radius of the pipe or the average fluid depth in an open system). In some embodiments, $(h/R)(\mu_1/\mu_2) > 0.5$. In some embodiments, R<1 mm.

In some embodiments, the impregnating liquid comprises an additive (e.g., a surfactant) to prevent or reduce evaporation of the impregnating liquid. In some embodiments, said surface comprises a pulled-up region of excess impregnating liquid (e.g., oil) extending above said solid features.

In another aspect, the invention is directed to an article comprising a liquid-impregnated surface, said surface comprising an impregnating liquid and a matrix of solid features spaced sufficiently close to stably contain the impregnating liquid therebetween or therewithin, wherein one or both of the following holds: (i) $0 < \phi \leq 0.25$, where $\phi$ is a representative fraction of the projected surface area of the liquid-impregnated surface corresponding to non-submerged solid (i.e., non-submerged by the impregnating liquid—can be "non-submerged" and still in contact with the non-vapor phase external to the surface) at equilibrium (e.g., where equilibrium can encompass pseudo-equilibrium); and (ii) $S_{oe(v)} < 0$, where $S_{oe(v)}$ is spreading coefficient, defined as $\gamma_{ev} - \gamma_{eo} - \gamma_{ov}$, where γ is the interfacial tension between the two phases designated by subscripts, said subscripts selected from e, v, and o, where e is a non-vapor phase (e.g., liquid or semi-solid) external to the surface and different from the impregnating liquid, v is vapor phase external to the surface (e.g., air), and o is the impregnating liquid.

In some embodiments, $0 < \phi \leq 0.25$. In some embodiments, $0.01 \ll 0.25$. In some embodiments, $0.05 < \phi \leq 0.25$. In some embodiments, $S_{oe(v)} < 0$.

In some embodiments, the impregnating liquid comprises at least one member selected from the group consisting of silicone oil, propylene glycol dicaprylate/dicaprate, perfluoropolyether (PFPE), polyalphaolefin (PAO), synthetic hydrocarbon cooligomer, fluorinated polysiloxane, propylene glycol, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, and amyl phthalate.

In some embodiments, the solid features comprise at least one member selected from the group consisting of a polymeric solid, a ceramic solid, a fluorinated solid, an intermetallic solid, and a composite solid. In some embodiments, the solid features comprise a chemically modified surface, coated surface, surface with a bonded monolayer. In some embodiments, the solid features define at least one member selected from the group consisting of pores, cavities, wells, interconnected pores, and interconnected cavities. In some embodiments, the solid features comprise at least one member selected from the group consisting of posts, nanoneedles, nanograss, substantially spherical particles, and amorphous particles. In some embodiments, the solid features have a rough surface (e.g., the solid features have a surface roughness <1 μm). In some embodiments, the rough surface provides stable impregnation of liquid therebetween or therewithin, such that $\theta_{os(v),receding} < \theta_c$, where $\theta_c$ is critical contact angle. In some embodiments, the liquid-impregnated surface is configured such that water droplets contacting the surface are not pinned or impaled on the surface and have a roll-off angle α of less than 40°. In some embodiments, the water droplets have a roll-off angle α of less than 35°, less than 30°, less than 25°, or less than 20°.

In another aspect, the invention is directed to an article comprising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(e),receding} = 0$; and (ii) $\theta_{os(v),receding} = 0$ and $\theta_{os(e),receding} = 0$, where $\theta_{os(e),receding}$ is receding contact angle of the impregnating liquid (e.g., oil, subscript 'o') on the surface (subscript 's') in the presence of a non-vapor (e.g., liquid, solid, semi-solid, gel) phase external to the surface that is different from the impregnating liquid (subscript 'e'), and where $\theta_{os(v),receding}$ is receding contact angle of the impregnating liquid (e.g., oil, subscript 'o') on the surface (subscript 's') in the presence of vapor phase (subscript 'v', e.g., air).

In another aspect, the invention is directed to an com- prising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(v),receding} > 0$; and (ii) $\theta_{os(e),receding} > 0$, where $\theta_{os(v),receding}$ is receding contact angle of the impregnating liquid (e.g., oil, subscript 'o') on the surface (subscript 's') in the presence of vapor phase (subscript 'v', e.g., air), and where $\theta_{os(e),receding}$ is receding contact angle of the impregnating liquid (e.g., oil, subscript 'o') on the surface (subscript 's') in the presence of a non-vapor (e.g., liquid, solid, semi-solid, gel) phase external to the surface that is different from the impregnating liquid (subscript 'e').

In some embodiments, both $\theta_{os(v),receding} > 0$ and $\theta_{es(e),receding} > 0$. In some embodiments, one or both of the following holds: (i) $\theta_{os(v),receding} < \theta_c$; and (ii) $\theta_{os(e),receding} < \theta_c$, where $\theta_c$ is critical contact angle. In some embodiments, one or both of the following holds: (i) $\theta_{os(v),receding} < \theta^*_c$; and (ii) $\theta_{os(e),receding} < \theta^*_c$, where $\theta^*_c = \cos^{-1}(1/r)$, and where r is roughness of the solid portion of the surface.

In some embodiments, the article is a member selected from the group consisting of a pipeline, a steam turbine part, a gas turbine part, an aircraft part, a wind turbine part, eyeglasses, a mirror, a power transmission line, a container, a windshield, an engine part, tube, nozzle, or a portion or coating thereof. In some embodiments, said surface comprises a pulled-up region of excess impregnating liquid (e.g., oil) extending above said solid features.

In some embodiments of any of the aspects described herein (e.g., herein above), the article further comprises material of said non-vapor phase external to said surface (and in contact with said surface), said article containing said non-vapor phase material [e.g. wherein the article is a container, a pipeline, nozzle, valve, a conduit, a vessel, a bottle, a mold, a die, a chute, a bowl, a tub, a bin, a cap (e.g., laundry detergent cap), and/or a tube]. In some embodiments, said material of said non-vapor phase external to said surface comprises one or more of the following: food, cosmetic, cement, asphalt, tar, ice cream, egg yolk, water, alcohol, mercury, gallium, refrigerant, toothpaste, paint, peanut butter, jelly, jam, mayonnaise, ketchup, mustard, condiment, laundry detergent, consumer product, gasoline, petroleum product, oil, biological fluid, blood, plasma.

In another aspect, the invention is directed to a method of using any article described herein (e.g., herein above), the method comprising the step of exposing said surface to water.

In another aspect, the invention is directed to a method, the method comprising the step of exposing said surface to said non-vapor phase (e.g., liquid or semi-solid) external to the surface and different from the impregnating liquid. In some embodiments, the non-vapor phase comprises one or more of the following: food, cosmetic, cement, asphalt, tar, ice cream, egg yolk, water, alcohol, mercury, gallium, refrigerant, toothpaste, paint, peanut butter, jelly, jam, mayonnaise, ketchup, mustard, condiment, laundry detergent, consumer product, gasoline, petroleum product, oil, biological fluid, blood, plasma.

BRIEF DESCRIPTION OF THE DRAWINGS

The objects and features of the invention can be better understood with reference to the drawing described below, and the claims.

FIG. 5 is a schematic showing conditions for the six liquid-impregnated surface wetting states shown in FIG. 4 in accordance with certain embodiments of the invention.

FIGS. 6A-C include a plot of roll-off angle versus emerged area fraction <| and two SEM images of BMIm impregnated texture, in accordance with certain embodiments of the invention.

FIGS. 7A-F and 8 demonstrate condensation inhibition by preventing coalescence due to liquid cloaking, in accordance with certain embodiments of the invention.

FIG. 11A shows measured roll-off angles for different encapsulating liquids as a function of post spacing b, according to some embodiments described herein. Extremely low roll-off angles were observed in some embodiments in the case of silicone oil impregnated surfaces, consistent with the post tops being encapsulated both outside and underneath the droplet (state A3-W3, $\theta_{os(a)}$, $\theta_{os(w)}$=0). The high roll-off angles seen in the case of BMIm impregnated surfaces are consistent with the post tops being emergent outside and underneath the droplet (state A2-W2, $\theta_c > \theta_{os(a)}$, $\theta_{os(w)} > 0$).

FIG. 11B shows an SEM image of the BMIm impregnated texture and reveals that the post tops are dry, in accordance with certain embodiments of the invention.

FIG. 11C shows an SEM image of the posts that are further roughened by adding nanograss, the posts are covered with BMIm and consequently, the roll-off angle decreases, in accordance with certain embodiments of the invention.

FIG. 11D shows a non-dimensional plot of scaled gravitational force (left side of Eq. (11) discussed below) at the instant of roll-off as a function of the relevant pinning force (right side of Eq. (11) discussed below), demonstrating that the roll-off data is in general agreement with the scaling, in accordance with certain embodiments of the invention.

DESCRIPTION

Figure 1:
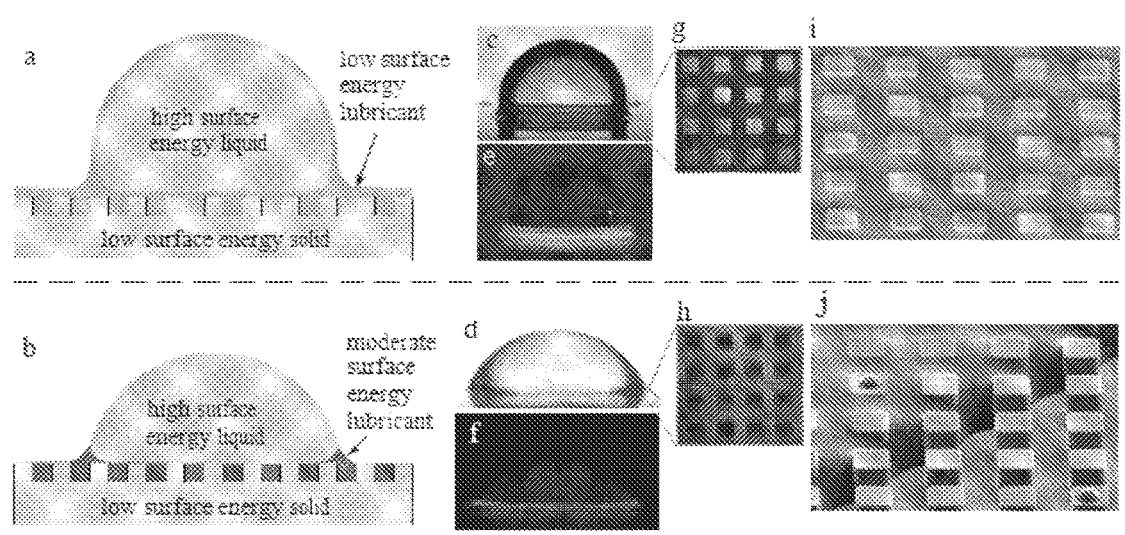
FIG. 1A illustrates a schematic diagram of a liquid droplet placed on a textured surface impregnated with a lubricant that wets the solid completely.
FIG. 1B illustrates a schematic diagram of a liquid droplet placed on a textured surface impregnated with a lubricant that wets the solid with a non-zero contact angle in the presence of air and the droplet liquid.
FIG. 1C illustrates a water droplet on a silicon micro post surface (post side a=10 μm, height=10 μm, and spacing b=10 μm) coated with OTS (octadecyltrichlorosilane) and impregnated with silicone oil.
FIG. 1D illustrates a water droplet on a silicon micro post surface (post side a=10 μm, height=10 μm, and spacing b=10 μm) coated with OTS (octadecyltrichlorosilane) and impregnated with 1-butyl-3-methylimidazolium bis(trifluoromethylsulfonyl) imide (BMIm).
FIGS. 1E and 1F illustrate a water droplet under UV illumination when a fluorescent dye was dissolved in silicone oil and BMIm. The bottom regions show that the lubricating oils are pulled up above the texture surface (b=50 μm).
FIGS. 1G and 1H show laser confocal fluorescence microscopy (LCFM) images of the impregnated texture showing that post tops were bright in the case of silicone oil (FIG. 1G), suggesting that they were covered with oil, and were dark in the case of BMIm (FIG. 1H), suggesting that they were dry.
FIG. 1I illustrates an ESEM image of the impregnated texture showing the silicone oil trapped in the texture and suggesting that the film that wets the post tops is thin.
FIG. 1J illustrates a SEM image of the texture impregnated with BMIm showing discrete droplets on post tops indicating that a film was not stable in this case.
FIG. 1K illustrates schematics of wetting configurations outside and underneath a drop. The total interface energies per unit area are calculated for each configuration by summing the individual interfacial energy contributions. Equivalent requirements for stability of each configuration are also shown in FIG. 1A.

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where articles, devices, apparatus and systems are described as having, including, or comprising specific components, or where processes and methods are described as having, including, or comprising specific steps, it is contemplated that, additionally, there are articles, devices, apparatus and systems of the present invention that consist essentially of, or consist of, the recited components, and that there are processes and methods according to the present invention that consist essentially of, or consist of, the recited processing steps.

Similarly, where articles, devices, mixtures, apparatus and compositions are described as having, including, or comprising specific compounds and/or materials, it is contemplated that, additionally, there are articles, devices, mixtures, apparatus and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Surfaces with designed chemistry and roughness possess remarkable non-wetting properties, which can be very useful in a wide variety of commercial and technological applications, as will be described in further detail below.

In some embodiments, where "a" is used as a subscript of a variable to denote air, "v" is also appropriate (where v indicates a vapor phase). Also, where "w" as a subscript of a variable to denote water, "e" is also appropriate (where e indicates a non-vapor (e.g., liquid, solid, semi-solid, gel) phase external to the surface that is different from the impregnating liquid.

In some embodiments, a non-wetting, liquid-impregnated surface is provided that includes a solid having textures (e.g., posts) that are impregnated with an impregnating liquid. In some embodiments, the lubricant is stabilized by the capillary forces arising from the microscopic texture, and provided that the lubricant wets the solid preferentially, this allows the droplet to move (e.g., slide, roll, slip, etc.) above the liquid-impregnated surface with remarkable ease, as evidenced by the extremely low contact angle hysteresis (~1°) of the droplet. In some embodiments, in addition to low hysteresis, these non-wetting surfaces can provide self-cleaning properties, withstand high drop impact pressures, self-heal by capillary wicking upon damage, repel a variety of liquids, and reduce ice adhesion. Contact line morphology governs droplet pinning and hence its mobility on the surface.

In general, solid features can be made from or can comprise any material suitable for use in accordance with the present invention. In accordance with various embodiments of the present invention, micro-scale solid features are used (e.g., from about 1 micron to about 100 microns in characteristic dimension, e.g., from about 1-10 microns, 10-20 microns, 20-30 microns, 30-50 microns, 50-70 microns, 70-100 microns). In certain embodiments, nano-scale solid features are used (e.g., less than about 1 micron, e.g., about 1 nm to about 1 micron e.g., about 1-10 nm, 10-50 nm, 50-100 nm, 100-200 nm, 200-300 nm, 300-500 nm, 500-700 nm, 700 nm-1 micron).

In some embodiments, micro-scale features are used. In some embodiments, a micro-scale feature is a particle. Particles can be randomly or uniformly dispersed on a surface. Characteristic spacing between particles can be about 200 μm, about 100 μm, about 90 μm, about 80 μm, about 70 μm, about 60 μm, about 50 μm, about 40 μm, about 30 μm, about 20 μm, about 10 μm, about 5 μm or 1 μm. In some embodiments, characteristic spacing between particles is in a range of 100 μm-1 μm, 50 μm-20 μm, or 40 μm-30 μm. In some embodiments, characteristic spacing between particles is in a range of 100 μm-80 μm, 80 μm-50 μm, 50 μm-30 μm or 30 μm-10 μm. In some embodiments, characteristic spacing between particles is in a range of any two values above.

Particles can have an average dimension of about 200 μm, about 100 μm, about 90 μm, about 80, about 70 μm, about 60 μm, about 50 μm, about 40 μm, about 30 μm, about 20 μm, about 10 μm, about 5 μm or 1 μm. In some embodiments, an average dimension of particles is in a range of 100 μm-1 μm, 50 μm-10 μm, or 30 μm-20 μm. In some embodiments, an average dimension of particles is in a range of 100 μm-80 μm, 80 μm-50 μm, 50 μm-30 μm or 30 μm-10 μm. In some embodiments, an average dimension of particles is in a range of any two values above.

In some embodiments, particles are porous. Characteristic pore size (e.g., pore widths or lengths) of particles can be about 5000 nm, about 3000 nm, about 2000 nm, about 1000 nm, about 500 nm, about 400 nm, about 300 nm, about 200 nm, about 100 nm, about 80 nm, about 50, about 10 nm. In some embodiments, characteristic pore size is in a range of 200 nm-2 μm or 100 nm-1 μm. In some embodiments, characteristic pore size is in a range of any two values above.

In some embodiments, the liquid-impregnated surface is configured such that water droplets contacting the surface are not pinned or impaled on the surface.

As used herein, emerged area fraction ϕ is defined as a representative fraction of the projected surface area of the liquid-impregnated surface corresponding to non-submerged solid at equilibrium. The term "equilibrium" as used herein refers to the condition in which the average thickness of the impregnating film does not change over time due to drainage by gravity when the substrate is held away from horizontal, and where evaporation is negligible (e.g., if the liquid impregnated liquid were to be placed in an environment saturated with the vapor of that impregnated liquid). Similarly, the term "pseudo-equilibrium" as used herein refers to equilibrium with the condition that evaporation may occur or gradual dissolving may occur. Note that the average thickness of a film at equilibrium may be less on parts of the substrate that are at a higher elevation, due to the decreased hydrostatic pressure within the film at increasing elevation. However, it will eventually reach an equilibrium (or pseudo-equilibrium), in which the average thickness of any part of the surfaces is unchanging with time.

In general, a "representative fraction" of a surface refers to a portion of the surface with a sufficient number of solid features thereupon such that the portion is reasonably representative of the whole surface. In certain embodiments, a "representative fraction" is at least a tenth of the whole surface.

Figure 14:
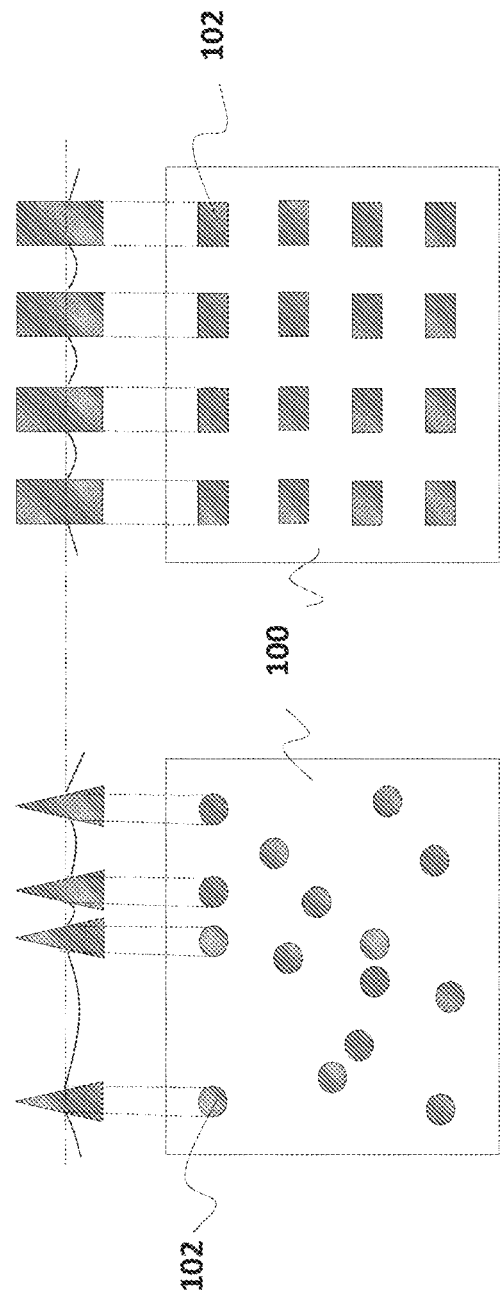
FIG. 14 illustrates a schematic cross-sectional and corresponding top view of a liquid-impregnated surface that are partially submerged.

Referring to FIG. 14, a schematic cross-sectional view and the corresponding top view of a liquid-impregnated surface that is partially submerged is shown. The upper left drawing of FIG. 14 shows a cross-sectional view of a row of cone-shaped solid features. The projected surface area of the non-submerged solid 102 is illustrated as shaded areas of the overhead view, while the remaining non-shaded area represents the projected surface area of the submerged liquid-impregnated surface 100. In addition to the projection surface area of this row of solid features, other solid features placed in a semi-random pattern are shown in shade in the overhead view. Similarly, the cross-section view of a row of evenly spaced posts is shown on the right of FIG. 14. Additional rows of well-patterned posts are shown in shade in the overhead view. As demonstrated, in some embodiments of the present invention, a liquid-impregnated surface includes randomly and/or non-randomly patterned solid features.

In certain embodiments of the present invention, ϕ is less than 0.30, 0.25, 0.20, 0.15, 0.10, 0.05, 0.01, or 0.005. In certain embodiments, ϕ is greater than 0.001, 0.005, 0.01, 0.05, 0.10, 0.15, or 0.20. In certain embodiments, ϕ is in a range of about 0 and about 0.25. In certain embodiments, ϕ is in a range of about 0 and about 0.01. In certain embodiments, ϕ is in a range of about 0.001 and about 0.25. In certain embodiments, ϕ is in a range of about 0.001 and about 0.10.

In some embodiments, the liquid-impregnated surface is configured such that cloaking by the impregnating liquid can be either eliminated or induced, according to different embodiments described herein.

As used herein, the spreading coefficient, $S_{ow(a)}$ is defined as $\gamma_{wa} - \gamma_{wo} - \gamma_{oa}$, where γ is the interfacial tension between the two phases designated by subscripts w, a, and o, where w is water, a is air, and o is the impregnating liquid. Interfacial tension can be measured using a pendant drop method as described in Stauffer, C. E., "The measurement of surface tension by the pendant drop technique," J. Phys. Chem. 1965, 69, 1933-1938, the text of which is incorporated by reference herein. Exemplary surfaces and its interfacial tension measurements (at approximately 25° C.) are Table 3 below.

Without wishing to be bound to any particular theory, impregnating liquids that have $S_{ow(a)}$ less than 0 will not cloak matter as seen in FIG. 1C, resulting in no loss of impregnating liquids, whereas impregnating liquids that have $S_{ow(a)}$ greater than 0 will cloak matter (condensed water droplets, bacterial colonies, solid surface) as seen in FIG. 1B and this may be exploited to prevent corrosion, fouling, etc. In certain embodiments, cloaking is used for preventing vapor-liquid transformation (e.g., water vapor, metallic vapor, etc.). In certain embodiments, cloaking is used for inhibiting liquid-solid formation (e.g., ice, metal, etc.). In certain embodiments, cloaking is used to make reservoirs for carrying the materials, such that independent cloaked materials can be controlled and directed by external means (like electric or magnetic fields).

FIG. 1C illustrates a water droplet on a silicon micro post surface (post side a=10 μm, height=10 μm, and spacing b=10 μm) coated with OTS (octadecyltrichlorosilane) and impregnated with silicone oil. FIG. 1D illustrates a water droplet on a silicon micro post surface (post side a=10 μm, height=10 μm, and spacing b=10 μm) coated with OTS (octadecyltrichlorosilane) and impregnated with 1-butyl-3-methylimidazolium bis(trifluoromethylsulfonyl) imide (BMIm). FIGS. 1E and 1F illustrate a water droplet under UV illumination when a fluorescent dye was dissolved in silicone oil and BMIm. The bottom regions show that the lubricating oils are pulled up above the texture surface (b=50 μm).

FIG. 1C shows an 8 μl water droplet placed on the silicone oil impregnated texture. The droplet forms a large apparent contact angle (~100°) but very close to the solid surface (shown by arrows in FIG. 1C), its profile changes from convex to concave.

When a fluorescent dye was added to the silicone oil and imaged under UV light, the point of inflection corresponded to the height to which an annular ridge of oil was pulled up in order to satisfy a vertical force balance of the interfacial tensions at the inflection point (FIG. 1E). Although the oil should spread over the entire droplet (FIG. 1C), the cloaking film was too thin to be captured in these images. The "wetting ridge" was also observed in the case of ionic liquid (FIGS. 1D, 1F). The importance of the wetting ridge to droplet mobility will be discussed below. Such wetting ridges are reminiscent of those observed around droplets on soft substrates.

The texture can be completely submerged in the oil if $\theta_{os(a)}=0°$. This condition was found to be true for silicone oil, implying that the tops of the posts should be covered by a stable thin oil film. This film was observed experimentally using laser confocal fluorescence microscopy (LCFM); the post tops appear bright due to the presence of a fluorescent dye that was dissolved in the oil (FIG. 1G). Environmental SEM images of the surface (FIG. 1I) show the oil-filled texture and confirm that this film is less than a few microns thick, consistent with prior estimates of completely-wetting films. On the other hand, BMIm has a non-zero contact angle on a smooth OTS-coated silicon surface ($\theta_{os(a)}=65±5°$) indicating that with this lubricant the post tops should remain dry. Indeed, LCFM images confirmed this (FIG. 1H)—the post tops appear dark as there is no dye present to fluoresce. Since BMIm is conductive and has an extremely low vapor pressure, it could be imaged in a SEM. As shown in FIG. 1J, discrete droplets resting on post tops are seen, confirming that a thin film was not stable on the post tops in this case.

The stable wetting configuration affects the mobility of droplets. As shown in FIG. 1B, in the case of BMIm, there are three distinct phase contact lines at the perimeter of the drop that confine the wetting ridge: the oil-water-air contact line, the oil-solid-air contact line outside the drop, and the oil-solid-water contact line underneath the drop. These contact lines exist because $\theta_{os(a)}>0$, $\theta_{os(w)}>0$, and $S_{ow(a)}<0$. In contrast, in the case of silicone oil (FIG. 1A), none of these contact lines exist because $\theta_{os(a)}=0$, $\theta_{os(w)}=0$, and $S_{ow(a)}>0$. These configurations are just two of the 12 different configurations in such a four-phase system where oil impregnation is possible. These configurations are discussed below.

A thermodynamic framework that allows one to predict which of these 12 states will be stable for a given droplet, oil, and substrate material will be discussed in the paragraphs below. There are three possible configurations to consider for the interface outside of the droplet (in an air environment), and three possible configurations to consider for the interface underneath the droplet (in a water environment). These configurations are shown in FIG. 1K along with the total interface energy of each configuration. The configurations possible outside the droplet are A1 (not impregnated, i.e., dry), A2 (impregnated with emergent features), and A3 (impregnated with submerged features—i.e., encapsulated). On the other hand, underneath the droplet, the possible configurations are W1 (impaled), W2 (impregnated with emergent features), and W3 (impregnated with submerged features—i.e., encapsulated). The stable configuration will be the one that has the lowest total interface energy. Referring now to configurations outside the droplet, the textured surface as it is slowly withdrawn from a reservoir of oil could be in any of states A1, A2, and A3 depending on which has the lowest energy. For example, state A2 would be stable if it has the lowest total interface energy, i.e. $E_{A2}<E_{A1}, E_{A3}$. From FIG. 1K, this results in:

$$E_{A2}<E_{A1} \Leftrightarrow (\gamma_{sa}-\gamma_{os})/\gamma_{oa}>(1-\phi)/(r-\phi) \quad (1)$$

$$E_{A2}<E_{A3} \Leftrightarrow \gamma_{sa}-\gamma_{os}-\gamma_{oa}<0 \quad (2)$$

where φ is the fraction of the projected area of the surface that is occupied by the solid and r is the ratio of total surface area to the projected area of the solid. In the case of square posts with width "a", edge-to-edge spacing "b", and height "h", $\phi=a^2/(a+b)^2$ and $r=1+4ah/(a+b)^2$. Applying Young's equation, $\cos(\theta_{os}(a))=(\gamma_{sa}-\gamma_{os})/\gamma_{oa}$, Eq. (1) reduces to the hemi-wicking criterion for the propagation of oil through a textured surface: $\cos(\theta_{os}(a))>(1-\phi)/(r-\phi)=\cos(\theta_c)$. This requirement can be conveniently expressed as $\theta_{os(a)}<\theta_c$. In Eq. (2), $\gamma_{sa}-\gamma_{os}-\gamma_{oa}$, is simply the spreading coefficient $S_{os(a)}$ of oil on the textured surface in the presence of air. This may be reorganized as $(\gamma_{sa}-\gamma_{os})/\gamma_{oa}<1$, and applying Young's equation again, Eq. (2) can be written as $\theta_{os(a)}>0$. Expressing Eq. (1) in terms of the spreading coefficient $S_{os(a)}$, yields: $-\gamma_{oa}(r-1)/(r-\phi)<S_{os(a)}$. The above simplifications then lead to the following equivalent criteria for the surface to be in state A2:

$$E_{A2}<E_{A1}, E_{A3} \Leftrightarrow \theta_c>\theta_{os(a)}>0° -\gamma_{oa}(r-1)/(r-\phi)<S_{os(a)}<0 \quad (3)$$

Similarly, state A3 would be stable if $E_{A3}<E_{A2}, E_{A1}$. From FIG. 1K, this gives:

$$E_{A3}<E_{A2} \Leftrightarrow \theta_{os(a)}=0 \Leftrightarrow \gamma_{sa}-\gamma_{os}-\gamma_{oa}=S_{os(a)}\geq 0 \quad (4)$$

$$E_{A3}<E_{A1} \Leftrightarrow \theta_{os(a)}<\cos^{-1}(1/r) \Leftrightarrow S_{os(a)}>-\gamma_{oa}(1/1/r) \quad (5)$$

Note that Eq. (5) is automatically satisfied by Eq. (4), thus the criterion for state A3 to be stable (i.e., encapsulation) is given by Eq. (4). Following a similar procedure, the condition for state A1 to be stable can be derived as $$E_{A1} < E_{A2}, E_{A3} \leftrightarrow \theta_{os(a)} > \theta_c \leftrightarrow S_{os(a)} < -\gamma_{oa}(r-1)/(r-\phi) \quad (6)$$

The rightmost expression of Eq. (4) can be rewritten as $(\gamma_{sa} - \gamma_{os})/\gamma_{oa} \geq 1$. This raises an important point: Young's equation would suggest that if $\theta_{os(a)} = 0$, then $(\gamma_{sa} - \gamma_{os})/\gamma_{oa} = 1$ (i.e., $S_{os}(a) = 0$). However, $\theta_{os(a)} = 0$ is true also for the case that $(\gamma_{sa} - \gamma_{os})/\gamma_{oa} > 1$ (i.e. $S_{os(a)} > 0$). It is important to realize that Young's equation predicts the contact angle based on balancing the surface tension forces on a contact line—the equality only exists for a contact line at static equilibrium. For a spreading film ($S_{os(a)} > 0$) a static contact line doesn't exist, hence precluding the applicability of Young's equation.

The configurations possible underneath the droplet are discussed in the paragraphs below. Upon contact with water, the interface beneath the droplet will attain one of the three different states—W1, W2, or W3 (FIG. 1K)—depending on which has the lowest energy. Applying the same method to determine the stable configurations of the interface beneath the droplet, and using the total interface energies provided in Table 1, the stability requirements take a form similar to Eqs. (3), (4), and (6), with $\gamma_{oa}, \gamma_{sa}, \theta_{os(a)}, S_{os(a)}$, replaced with $\gamma_{ow}, \gamma_{sw}, \theta_{os(w)}, S_{os(w)}$ respectively. Notice also that $\theta_c$ is not affected by the surrounding environment as it is only a function of the texture parameters, (p and r. Thus, the texture will remain impregnated with oil beneath the droplet with emergent post tops (i.e., state W2) when:

$$E_{W2} < E_{W1}, E_{W3} \leftrightarrow \theta_c > \theta_{os(w)} > 0 \leftrightarrow -\gamma_{ow}(r-1)/(r-\phi) \leq S_{os(w)} < 0 \quad (7)$$

State W3 will be stable (i.e., the oil will encapsulate the texture) when:

$$E_{W3} < E_{W1}, E_{W2} \leftrightarrow \theta_{os(w)} = 0 \leftrightarrow \gamma_{sw} - \gamma_{os} - \gamma_{ow} \equiv S_{os(w)} \geq 0 \quad (8)$$

and the droplet will displace the oil and be impaled by the textures (state W1) when:

$$E_{W1} < E_{W2}, E_{W3} \leftrightarrow \theta_{os(w)} > \theta_c \leftrightarrow S_{os(w)} > -\gamma_{ow}(r-1)/(r-\phi) \quad (9)$$

Figure 2:
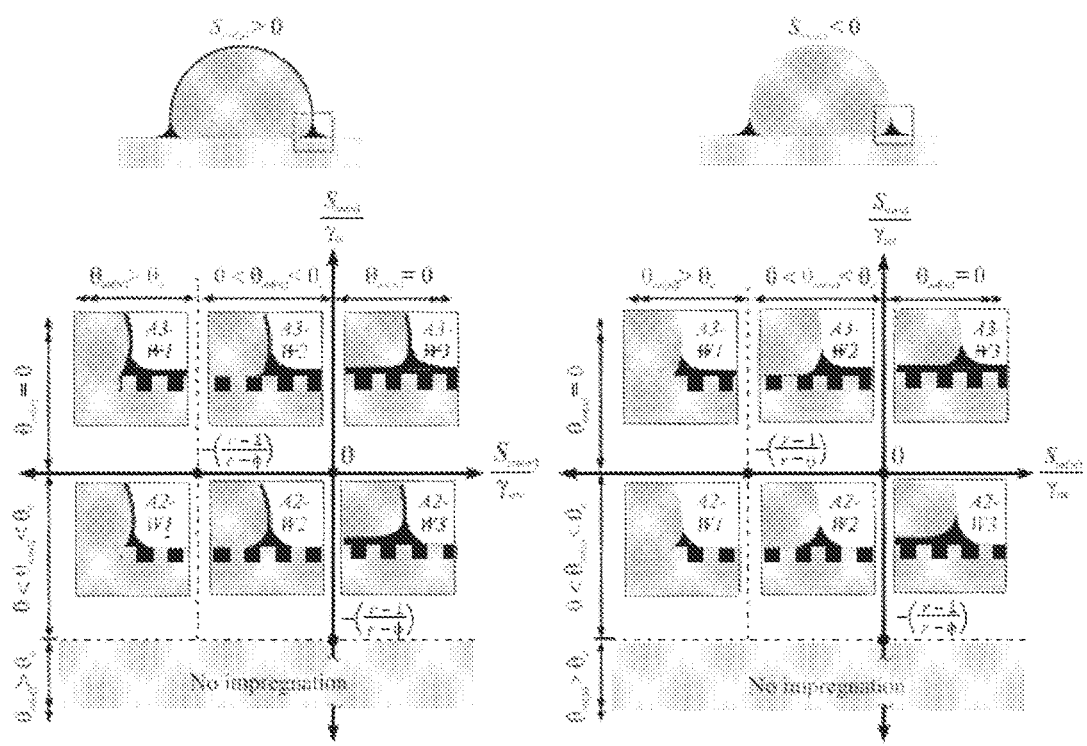
FIG. 2 illustrates a schematic diagram of possible thermodynamic states of a water droplet placed on a lubricant-encapsulated surface. The top two schematics illustrate whether or not the droplet becomes cloaked by the lubricant. For each case, there are six possible states, as illustrated, depending on how the lubricant wets the texture in the presence of air (the vertical axis) and water (horizontal axis).

Combining the above criteria along with the criterion for cloaking of the water droplet by the oil film described earlier, the various possible states can be organized in a regime map, which is shown FIG. 2. The cloaking criterion is represented by the upper two schematic drawings. For each of these cases, there are six different configurations possible depending on how the oil interacts with the surface texture in the presence of air (vertical axis in FIG. 2) and water (horizontal axis in FIG. 2). The vertical and horizontal axes are the normalized spreading coefficients $S_{os(a)}/\gamma_{oa}$ and $S_{os(w)}/\gamma_{ow}$ respectively. Considering first the vertical axis of FIG. 2, when $S_{os(a)}/\gamma_{oa} < -(r-1)/(r-\phi)$, i.e., when Eq. (6) holds, oil does not even impregnate the texture. As $S_{os(a)}/\gamma_{oa}$ increases above this important value, impregnation becomes feasible but the post tops are still left emerged. Once $S_{os(a)}/\gamma_{oa} > 0$, the post tops are also submerged in the oil leading to complete encapsulation of the texture. Similarly, on the x-axis of FIG. 2 moving from left to right, as $S_{os(w)}/\gamma_{ow}$ increases, the droplet transitions from an impaled state to an impregnated state to a fully-encapsulated state. Although prior studies have proposed simple criteria for whether a deposited drop would float or sink, additional states, as shown in FIG. 2, were not recognized.

FIG. 2 shows that there can be up to three different contact lines, two of which can get pinned on the texture. The degree of pinning determines the roll-off angle α*, the angle of inclination at which a droplet placed on the textured solid begins to move. Droplets that completely displace the oil (states A3-W1, A2-W1 in FIG. 2) are not expected to roll off the surface. These states are achieved when $\theta_{os(w)} > \theta_c$, as is the case for both BMIm and silicone oil impregnated surfaces when the silicon substrates are not treated with OTS. As expected, droplets did not roll off of these surfaces. Droplets in states with emergent post tops (A3-W2, A2-W2, A2-W3) are expected to have reduced mobility that is strongly texture dependent, whereas those in states with encapsulated posts outside and beneath the droplet (the A3-W3 states in FIG. 2) are expected to exhibit no pinning and consequently infinitesimally small roll-off angles.

Roll-off angles of 5 μl droplets on silicone oil and BMIm impregnated textures while varying the post spacing b were measured experimentally. For comparison, the same textures without a lubricant (i.e., the conventional superhydrophobic case) were also evaluated. The results of these experiments are shown in FIG. 11A. The silicone oil encapsulated surfaces have extremely low roll-off angles regardless of the post spacing and oil viscosity, showing that contact line pinning was negligible, as predicted for a liquid droplet in an A3-W3 state with no contact lines on the textured substrate. On the other hand, BMIm impregnated textures showed much higher roll-off angles, which increased as the spacing decreased—a trend that is similar to Cassie droplets on superhydrophobic surfaces. This observation illustrates that pinning was significant in this case, and occurs on the emergent post tops, illustrated in FIG. 11B. However, the pinning was significantly reduced by adding a second smaller length scale texture (i.e., nanograss on the posts), so that BMIm impregnated the texture even on the post tops, thereby substantially reducing φ (as illustrated by FIG. 11C as well as FIGS. 12-13). The roll-off angle decreased from over 300 to only about 2°. The reduction in the emergent area fraction 0 was not due to the absolute size of the texture features; since the oil-water and oil-air interfaces must intersect surface features at contact angles $\theta_{os(w)}$ and $\theta_{ow(a)}$, φ rather depends on these contact angles and feature geometry.

The effect of texture on the roll-off angle can be modelled by balancing gravitational forces with pinning forces. A force balance of a water droplet on a smooth solid surface at incipient motion gives $\rho_w \Omega g \sin \alpha^* \approx 2R_b \gamma_{wa}(\cos \theta_{rec,ws(a)} - \cos \theta_{adv,ws(a)})$, where $\rho_w$ is the density of the liquid droplet of volume Ω, g is the gravitational acceleration, $R_b$ is the droplet base radius, and $\theta_{adv,ws(a)}$ and $\theta_{rec,ws(a)}$ are the advancing and receding contact angles of droplet in air on the smooth solid surface. To extend this treatment to our system, we recognize that pinning results from contact angle hysteresis of up to two contact lines: an oil-air-solid contact line with a pinning force per unit length given by $\gamma_{oa}(\cos \theta_{rec,os(a)} - \cos \theta_{adv,os(a)})$ and an oil-water-solid contact line with a pinning force per unit length given by $\gamma_{ow}(\cos \theta_{rec,os(w)} - \cos \theta_{adv,os(w)})$. In some embodiments, the length of the contact line over which pinning occurs is expected to scale as $R_b \phi^{1/2}$, where $\phi^{1/2}$ is the fraction of the droplet perimeter (~$R_b$) making contact with the emergent features of the textured substrate. Thus, a force balance tangential to the surface gives:

$$\rho_w \Omega g \sin \alpha^* \approx R_b \phi^{1/2}[\gamma ow(\cos \theta_{rec,os(w)} - \cos \theta_{adv,os(w)}) + \gamma_{oa} \cos \theta_{rec,os(a)} - \cos \theta_{adv,os(a)})] \quad (10)$$

Dividing Eq. (10) by $R_b \gamma_{wa}$, we obtain a non-dimensional expression:

$$Bo \sin \alpha^* f(\theta) \sim \phi^{1/2}[\gamma_{ow}(\cos \theta_{rec,os(w)} - \cos \theta_{adv,os(w)}) + \gamma_{oa}(\cos \theta_{rec,os(a)} - \cos \theta_{adv,os(a)})]/\gamma_{wa} \quad (11)$$

where $$f(\theta) = \frac{\Omega^{\frac{1}{3}}}{R_b} = \left[\left(\frac{\pi}{3}\right)(2+\cos\theta)(1-\cos\theta)^2/\sin^3\theta)\right]^{1/3}$$

by assuming the droplet to be a spherical cap making an apparent contact angle θ with the surface.

$$Bo = \Omega^{\frac{2}{3}}\rho_w g/\gamma_{wa}$$

is the Bond number, which compares the relative magnitude of gravitational forces to surface tension forces. Values for $\theta_{rec,os(w)}$, $\sigma_{adv,os(w)}$, $\theta_{rec,os(a)}$, $\theta_{adv,os(a)}$, $\gamma_{ow}$, $\gamma_{oa}$, and $\gamma_{wa}$ are provided in Tables 2 and 3 below. FIG. 11D shows that the measured data is in agreement with the scaling of Eq. (11). The data for the silicone oil encapsulated surface and for the BMIm impregnated, nanograss-covered posts lie close to the origin as both $\phi$ and $\alpha^*$ are very small in these cases.

Figure 3:
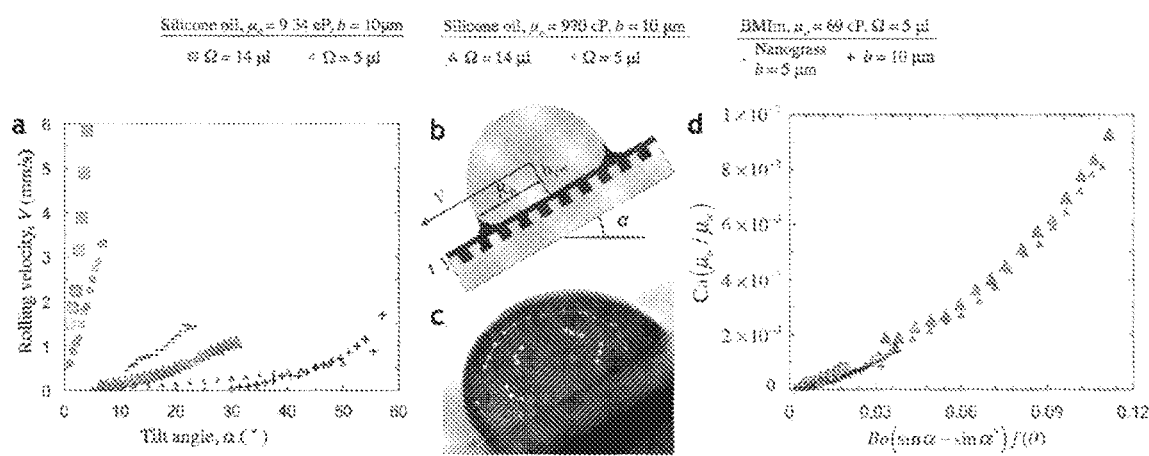
FIG. 3A illustrates measured velocities of water droplets as a function of substrate tilt angle for various lubricant viscosities, post spacings, and droplet sizes.
FIG. 3B is a schematic of a water droplet moving on a lubricant-impregnated surface showing the various parameters considered in the scaling model.
FIG. 3C illustrates trajectories of a number of coffee particles measured relative to the water droplet revealing that the drop rolls rather than slips across the surface.
FIG. 3D is a non-dimensional plot that collapses the data points shown in FIG. 3A onto a single curve.

Described in the following paragraphs are embodiments that illustrate dynamics of droplet shedding. Once the gravitational forces on a droplet overcome the pinning forces, the velocity attained by the droplet determines how quickly it can be shed, which reflects the non-wetting performance of the surface. For a droplet of volume Ω this velocity may depend on both the contact line pinning and viscosity of the lubricant. In some embodiments, the steady-state shedding velocity V of water droplets may be measured using a high-speed camera while systematically varying lubricant dynamic viscosity $\mu_o$, post spacing b, substrate tilt angle α, and droplet volume, Ω. These measurements are illustrated in FIG. 3A where V is plotted as a function of a for different $\mu_o$, b, and Ω; the velocity V, increases with α and Ω as both increase the gravitational force acting on the droplet. However, V decreases with $\mu_o$ and $\phi$ as both increase the resistance to droplet motion.

To explain these trends, it must first be determined whether the droplet is rolling or sliding. Referring now to the oil-water interface beneath the droplet as shown in FIG. 3B, the shear stress at this interface, on the water side, scales as $\tau_w \sim \mu_w(V-V_i)/h_{cm}$, and on the oil side scales as $\tau_o \sim \mu_o V_i/t$, where $V_i$ is the velocity of the oil-water interface and $h_{em}$ is the height of the centre of mass of the droplet above the solid surface, and t is the thickness of the oil film. Since $\tau_w$ must be equal to $\tau_o$ at the oil-water interface, $\mu_w(V-V_i)/h_{cm} \sim \mu_o V_i/t$. Rearranging this yields:

$$V_i/V \sim (1+(\mu_o h_{cm})/(\mu_w t))^{-1} \quad (12)$$

Since $(\mu_o/\mu_w)(h_{cm}/t) \gg 1$ in some of the conducted experiments, $V_i/V \ll 1$, i.e., the oil-water interface moves at a negligibly small velocity relative to that of the droplet's center of mass. Thus, in some embodiments, the droplets being shed were rolling off the surface. The experiment was repeated with ground coffee particles being added to the water droplets, and the motion of the ground coffee particles was tracked with a high speed camera as the droplet moved across the surface. Particle trajectories, shown in FIG. 3C, clearly show that the droplets roll across the liquid-impregnated surface as they are shed ($\mu_o$=96.4 cP).

To determine the magnitude of V, the rate of change of gravitational potential energy as the droplet rolls down the incline with the total rate of energy dissipation due to contact line pining and viscous effects were balanced. The resulting energy balance gives:

$$V(F_g - F_p) \sim \mu_w \int_{\Omega_{drop}} (\overline{\nabla u})_{drop}^2 d\Omega + \mu_o \int_{\Omega_{film}} (\overline{\nabla u})_{film}^2 d\Omega + \mu_o \mu_w \int_{\Omega_{ridge}} (\overline{\nabla u})_{ridge}^2 d\Omega \quad (13)$$

where $F_g$ and $F_p$ represent the net gravitational and pinning forces acting on the droplet, the Ω terms are the volume over which viscous dissipation occurs, and the $\overline{\nabla u}$ terms are the corresponding velocity gradients. The form of Eq. (13) is similar to that for viscous droplets rolling on completely non-wetting surfaces, though additional terms are present due to the presence of impregnated oil. The three terms on the right side of Eq.(13) represent the rate of viscous dissipation within the droplet (I), in the oil film beneath the droplet (II), and in the wetting ridge near the three-phase contact line (III).

The rate of viscous dissipation within the droplet (I) is primarily confined to the volume beneath its centre of mass and can be approximated as $I \sim \mu_w(V/h_{cm})^2 R_b^2 h_{cm}$, where $R_b$ is the base radius of the droplet. Applying geometrical relations for a spherical cap, $R_b/h_{cm}=g(\theta)=4/3(\sin\theta) (2+\cos\theta)/(1+\cos\theta)^2$, yields: $I \sim \mu_w V^2 R_b g(\theta)$ In some embodiments, the rate of viscous dissipation within the film (II) can be approximated as $II \sim \mu_o(V_i/t)^2 R_b^2 t$. Since $(\mu_w/\mu_0)(t/h_{cm}) \ll 1$, from Eq.(12), $\overline{\nabla} \overline{u}_{film} \sim V_i/t \sim (\mu_w/\mu_0)(V/h_{cm})$. Using $h_{cm}=R_b/g(\theta)$, yields:

$$II \sim \frac{\mu_w^2}{\mu_0} V^2 [g(\theta)]^2 t$$

In some embodiments, the rate of viscous dissipation in the wetting ridge (III) can be approximated as $III \sim \mu_0(V/h_{ridge})^2 R_b h^2_{ridge}$ since fluid velocities within the wetting ridge must scale as the velocities within the wetting ridge must scale as the velocity of the centre of mass and vanish at the solid surface, giving velocity gradients that scale as $\overline{\nabla} \overline{u}_{ridge} \sim V/h_{ridge}$, where $h_{ridge}$ is the height of the wetting ridge. Thus, $III \sim \mu_0 V^2 R_b$.

Noting that $F_g = \rho_w \Omega g \sin\alpha$ and $F_p = \rho_w \Omega g \sin\alpha^*$ and dividing both sides of Eq.(13) by $R_b V \gamma_{wa}$ yields.

$$Bo(\sin\alpha - \sin\alpha^*)f(\theta) \sim Ca\left\{g(\theta) + [g(\theta)]^2 \frac{\mu_w}{\mu_0} \frac{t}{R_b} + \frac{\mu_0}{\mu_w}\right\} \quad (14)$$

where $Ca = \mu_w V/\gamma_{wa}$, is the capillary number, $Bo = \Omega^{2/3}\rho_w g/\gamma_{wa}$ is the Bond number, and $f(\theta)=\Omega^{1/3}/R_b$. Since $(\mu_w/\mu_0)(t/R_b) \ll 1$, and $\mu_0/\mu_w \gg g(\theta)$ in some embodiments and experiments, Eq. (14) can be simplified to:

$$Bo(\sin\alpha - \sin\alpha^*)f(\theta) \sim Ca\frac{\mu_0}{\mu_w} \quad (15)$$

The datasets shown in FIG. 3A were organized according to Eq.(15) above and were found to collapse onto a single curve (FIG. 3D), demonstrating that the above scaling model captures the essential physics of the phenomenon: the gravitational potential energy of the rolling droplet is primarily consumed in viscous dissipation in the wetting ridge around the base of the rolling droplet. Furthermore, Eq.(14) and Eq.(15) apply for cloaked and uncloaked droplets, because inertial and gravitational forces in the cloaking films are very small. Consequently, the velocity is uniform across the film and viscous dissipation is negligible.

Droplets placed on lubricant-impregnated surfaces exhibit fundamentally different behavior compared to typical superhydrophobic surfaces. In some embodiments, these four-phase systems can have up to three different three-phase contact lines, giving up to twelve different thermodynamic configurations. In some embodiments, the lubricant film encapsulating the texture is stable only if it wets the texture completely (θ=0), otherwise portions of the textures dewet and emerge from the lubricant film. In some embodiments, complete encapsulation of the texture is desirable in order to eliminate pinning. In some embodiments, texture geometry and hierarchical features can be exploited to reduce the emergent areas and achieve roll-off angles close to those obtained with fully wetting lubricants. In some embodiments, droplets of low-viscosity liquids, such as water placed on these impregnated surfaces, roll rather than slip with velocities that vary inversely with lubricant viscosity. In some embodiments, additional parameters, such as droplet and texture size, as well as the substrate tilt angle, may be modeled to achieve desired droplet (and/or other substance) movement (e.g., rolling) properties and/or to deliver optimal non-wetting properties.

Figure 4:
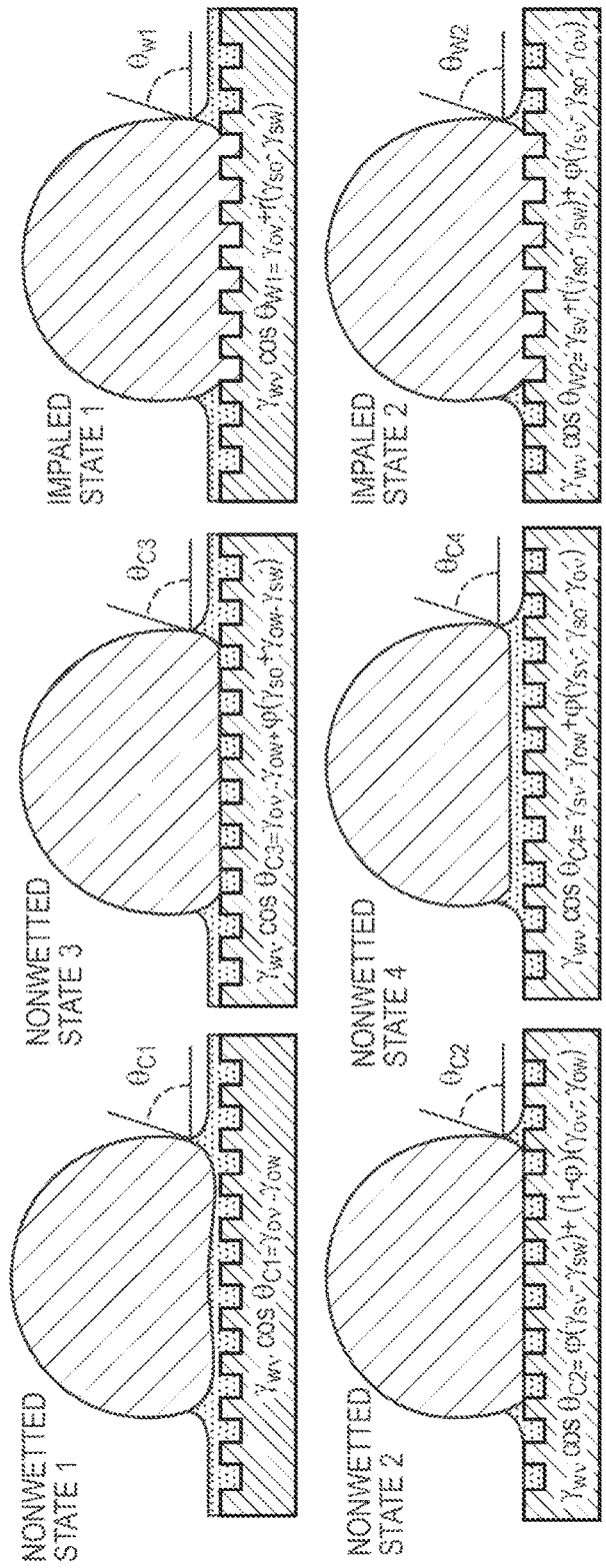
FIG. 4 is a schematic describing six liquid-impregnated surface wetting states, in accordance with certain embodiments of the invention.

FIG. 4 is a schematic describing six liquid-impregnated surface wetting states, in accordance with certain embodiments described herein. The six surface wetting states (state 1 through state 6) depend on the four wetting conditions shown at the bottom of FIG. 4 (conditions 1 to 4). In some embodiments, the non-wetted states are preferred (states 1 to 4). Additionally, where a thin film stably forms on the tops of the posts (or other features on the surface), as in non-wetted states 1 and 3, even more preferable non-wetting properties (and other related properties described herein) may be observed.

In order to achieve non-wetted states, it is often preferable to have low solid surface energy and low surface energy of the impregnated liquid compared to the nonwetted liquid. For example, surface energies below about 25 mJ/m$^2$ are desired in some embodiments. Low surface energy liquids include certain hydrocarbon and fluorocarbon-based liquids, for example, silicone oil, perfluorocarbon liquids, perfluorinated vacuum oils (e.g., Krytox 1506 or Fromblin 06/6), fluorinated coolants such as perfluoro-tripentylamine (e.g., FC-70, sold by 3M, or FC-43), fluorinated ionic liquids that are immiscible with water, silicone oils comprising PDMS, and fluorinated silicone oils.

Examples of low surface energy solids include the following: silanes terminating in a hydrocarbon chain (such as octadecyltrichlorosilane), silanes terminating in a fluorocarbon chain (e.g., fluorosilane), thiols terminating in a hydrocarbon chain (such butanethiol), and thiols terminating in a fluorocarbon chain (e.g. perfluorodecane thiol). In certain embodiments, the surface comprises a low surface energy solid such as a fluoropolymer, for example, a silsesquioxane such as fluorodecyl polyhedral oligomeric silsesquioxane. In certain embodiments, the fluoropolymer is (or comprises) tetrafluoroethylene (ETFE), fluorinated ethylenepropylene copolymer (FEP), polyvinylidene fluoride (PVDF), perfluoroalkoxytetrafluoroethylene copolymer (PFA), polytetrafluoroethylene (PTFE), tetrafluoroethylene, perfluoromethylvinylether copolymer (MFA), ethylenechlorotrifluoroethylene copolymer (ECTFE), ethylene-tetrafluoroethylene copolymer (ETFE), perfluoropolyether, or Tecnoflon.

In FIG. 4, $\gamma_{wv}$ is the surface energy of the non-wetted phase in equilibrium with vapor; $\gamma_{ow}$ is the interfacial energy between the non-wetted phase and the impregnated liquid; $\gamma_{ov}$ is the surface energy of the impregnated liquid phase in equilibrium with vapor; $\gamma_{sv}$ is the surface energy of the solid in equilibrium with vapor; $\gamma_{so}$ is the interfacial energy between the impregnated phase and the solid; $\gamma_{sw}$ is the interfacial energy between the solid and the non-wetted phase; r=total surface area divided by projected surface area; $\Theta_{c1}$, $\Theta_{c2}$, $\Theta_{c3}$, $\Theta_{c4}$, $\Theta_{w1}$, $\Theta_{w2}$, are the macroscopic contact angles made by the non-wetted phase in each wetting state; $\Theta^*_{os(v)}$ is the macroscopic contact angle of oil on the textured substrate when the phase surrounding the textured substrate is vapor; $\Theta_{os(v)}$ is the contact angle of oil on a smooth solid substrate of the same chemistry when the phase surrounding the oil droplet is vapor; $\Theta^*_{os(w)}$ is the macroscopic contact angle of oil on the textured substrate when the phase surrounding the oil droplet is water; and $\theta_{os(w)}$ is the contact angle of oil on a smooth substrate of the same chemistry as the textured surface when the phase surrounding the oil droplet is water.

FIG. 5 is a schematic showing conditions for the six liquid-impregnated surface wetting states shown in FIG. 4, in accordance with certain embodiments of the invention.

In certain embodiments, lubricant cloaking is desirable and is used a means for preventing environmental contamination, like a time capsule preserving the contents of the cloaked material. Cloaking can result in encasing of the material thereby cutting its access from the environment. This can be used for transporting materials (such as bioassays) across a length in a way that the material is not contaminated by the environment.

In certain embodiments, the amount of cloaking can be controlled by various lubricant properties such as viscosity, surface tension. Additionally or alternatively, the de-wetting of the cloaked material to release the material may be controlled. Thus, it is contemplated that a system in which a liquid is dispensed in the lubricating medium at one end, and upon reaching the other end is exposed to environment that causes the lubricant to uncloak.

In certain embodiments, an impregnating liquid is or comprises an ionic liquid. Ionic liquids have extremely low vapor pressures (~10$^{-12}$ mmHg), and therefore they mitigate the concern of the lubricant loss through evaporation. In some embodiments, an impregnating liquid can be selected to have a $S_{ow(a)}$ less than 0. Exemplary impregnating liquids include, but are not limited to, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), tetradecane, cyclohexane, ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, amyl phthalate and any combination thereof.

In accordance with the present invention, exemplary solid features include, but are not limited to, polymeric solid, a ceramic solid, a fluorinated solid, an intermetallic solid, and a composite solid and any combination thereof. As demonstrated in FIG. 14, solid features can comprise any suitable shapes and/or define any suitable structures. Exemplary solid features include, but are not limited to, pores, cavities, wells, interconnected pores, and interconnected cavities and any combination thereof.

In some embodiments, solid features have a roughened surface. As used herein, $\theta_{os(a)}$ is defined as the contact angle of oil (subscript 'o') on the textured solid (subscript 's') in the presence of air (subscript 'a'). In certain embodiments, the roughened surface of solid features provides stable impregnation of liquid therebetween or therewithin, when $\theta_{os(v)} > \theta_c$.

In certain embodiments, liquid-impregnated surfaces described herein have advantageous droplet roll-off properties that minimize the accumulation of the contacting liquid on the surfaces. Without being bound to any particular theory, a roll-off angle $\alpha$ of the liquid-impregnated surface in certain embodiments is less than 50°, less than 40°, less than 30°, less than 25°, or less than 20°.

Typically, flow through a pipe or channel, having an liquid-impregnate surface on its interior may be modeled according to Eq. (14):

$$\frac{Q}{\Delta p/L} \sim \left(\frac{R^4}{\mu_1}\right)\left[1 - \left(\frac{h}{R}\right)\left(\frac{\mu_1}{\mu_2}\right)\right] \quad (14)$$

where Q is the volumetric flow rate, R is pipe radius, h is the height of the texture, $\mu_2$ is the viscosity of lubricant and $\mu_1$ is the viscosity of the fluid flowing through the pipe. $\Delta p/L$ is the pressure drop per L. Without being bound to any particular theory, it is believed that $(h/R)(\mu_1/\mu_2)$ is greater than 1 for this to have a significant effect and this sets the height of the texture in relation to the viscosity ratio.

Although modeled for pipe flow, the general principals also apply to open systems, where R is replaced with the characteristic depth of the flowing material. The average velocity of the flow~Q/A, where A is the cross-sectional area of the flowing fluid.

For example, mayonnaise has a viscosity that approaches infinity at low shear rates (it is a Bingham plastic (a type of non-Newtonian material)), and therefore behaves like a solid as long as shear stress within it remains below a critical value. Whereas, for honey, which is Newtonian, the flow is much slower. For both systems, h and R are of the same order of magnitude, and $\mu_2$ is the same. However, since $\mu_{honey} \ll \mu_{mayonnaise}$, then $$\left(\frac{h}{R}\right)\left(\frac{\mu_{honey}}{\mu_2}\right) \ll \left(\frac{h}{R}\right)\left(\frac{\mu_{mayonnaise}}{\mu_2}\right) \quad (15)$$

thus mayonnaise flows much more quickly out of the bottle than honey.

According to some embodiments of the present invention, an article includes an interior surface, which is at least partially enclosed (e.g., the article is an oil pipeline, other pipeline, consumer product container, other container) and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin, wherein the impregnating liquid comprises water (having viscosity µ2). In certain embodiments, µ1/µ2 is greater than about 1, about 0.5, or about 0.1.

In certain embodiments, the impregnating liquid comprises an additive to prevent or reduce evaporation of the impregnating liquid. The additive can be a surfactant. Exemplary surfactants include, but are not limited to, docosanoic acid, trans-13-docosenoic acid, cis-13-docosenoic acid, nonylphenoxy tri(ethyleneoxy) ethanol, methyl 12-hydroxyoctadecanate, 1-Tetracosanol, fluorochemical "L-1006", and combination thereof. More details can be found in White, Ian. "Effect of Surfactants on the Evaporation of Water Close to 100 C." Industrial & Engineering Chemistry Fundamentals 15.1 (1976): 53-59, the contents of which are incorporated herein by references. In addition or alternative, exemplary additives can be $C_{16}H_{33}COOH$, $C_{17}H_{33}COOH$, $C_{18}H_{33}COOH$, $C_{19}H_{33}COOH$, $C_{14}H_{29}OH$, $C_{16}H_{33}OH$, $C_{18}H_{37}OH$, $C_{20}H_{41}OH$, $C_{22}H_{45}OH$, $C_{17}H_{35}COOCH_3$, $C_{15}H_{31}COOC_2H_5$, $C_{16}H_{33}OC_2H_4OH$, $C_{18}H_{37}OC_2H_4OH$, $C_{20}H_{41}OC_2H_4OH$, $C_{22}H_{45}OC_2H_4OH$, Sodium docosyl sulfate, poly(vinyl stearate), Poly (octadecyl acrylate). Poly (octadecyl methacrylate) and combination thereof. More details can be found in Barnes, Geoff T. "The potential for monolayers to reduce the evaporation of water from large water storages." *Agricultural Water Management* 95.4 (2008): 339-353, the contents of which are incorporated herein by references.

Experimental Examples

Example 1

FIGS. 6A-C show experimental measurements of water droplet mobility on liquid impregnating surfaces. FIG. 6A is a plot of roll-off angle $\alpha$ as a function of emerged area fraction $\phi$, for different surfaces (feature spacing b varies). An ionic liquid (1-butyl-3-methylimidazolium bis(trifluoromethylsulfonyl) imide (BMIm) was used as a impregnating liquid in this work. The top inset (FIG. 6B) shows an SEM image of the BMIm impregnated texture and shows that the post tops are dry. In FIG. 6C, when the posts are further roughened by adding nanograss, they are covered with BMIm (bottom inset) and consequently, the roll-off angle decreases.

The experiments of FIGS. 6A-C demonstrate that liquid-impregnated surfaces can be engineered to provide resistance to impalement and to provide non-wettability, without requiring replenishment of impregnating fluid to make up for liquid lost to cloaking (BMIm is an example liquid that does not cloak in the presence of air and water), and without requiring replenishment of impregnating liquid to maintain coverage over the tops of the solid features.

BMIm impregnated textures showed roll-off angles that increase as the spacing decreases. This observation shows that pinning is non-negligible in this case, and occurs on the emergent post tops (FIG. 6B). However, this pinning was significantly reduced by adding a second smaller length scale texture (i.e. nanograss on the posts), so that BMIm impregnated the texture even on the post tops, thereby substantially reducing $\phi$ (though still non-zero) (see FIG. 6C). It is important to note that the reduction in the emergent area fraction $\phi$ is not due to the absolute size of the texture features; since the oil-water and oil-air interfaces typically intersect surface features at contact angles $\theta_{os(w)}$ and $\theta_{ow(a)}$, $\phi$ rather depends on these contact angles and feature geometry.

Example 2

This Example demonstrates that condensation can be inhibited by preventing coalescence due to liquid cloaking.

FIG. 7A shows an ESEM image sequence of condensation on a micropost surface impregnated with Krytox that has positive spreading coefficient on water ($S_{ow}>0$). Condensation is inhibited as Krytox cloaks the condensed droplets. FIG. 7B illustrates cloaked condensate droplet depicting the thin film of condensate that spreads on the droplet. FIG. 7C shows an ESEM image sequence of condensation on micropost surface impregnated with BMIm that has negative spreading coefficient with water ($S_{ow}<0$). FIG. 7B illustrates uncloaked condensate droplet depicting the three phase contact line of the water-vapor, water-lubricant, and lubricant-vapor interfaces on one end and pinning of the droplet at the dry post tops at the other end. FIG. 7E is a plot comparing variation of surface area fraction covered by condensed water droplets versus time on surfaces impregnated with Krytox ($S_{ow}>0$, solid squares) and BMIm ($S_{ow}<0$, open diamonds). FIG. 7F is a plot comparing number of water droplets per unit area versus time on surfaces impregnated with Krytox (solid squares) and BMIm (open diamonds). The ESEM experiments were conducted under identical conditions (pressure=800 Pa, substrate temperature~3.6° C., beam voltage=25 kV and beam current=1.7 nA). In the analysis, t=0 s is defined as the first frame in which water drops can be identified.

Referring to FIG. 8, the very high subcooling is sufficient for condensation rate to overcome the cloaking phenomenon for 10 cSt oil. The temperature of the peltier cooler was set at −5° C. The room temperature was 20° C., and the dew point in the conditions was 12° C. However, the barrier for coalescence is significantly higher on more viscous lubricant even at this high degree of subcooling. As a result, the droplets appear on 10 cSt oil as hemispherical shapes, whereas on more viscous lubricant their sphericity is significantly lower.

Example 3

This Example demonstrates that condensation is inhibited by the decreased drainage rate of oil between neighboring water droplets, particularly where the oil has high viscosity.

Figure 9:
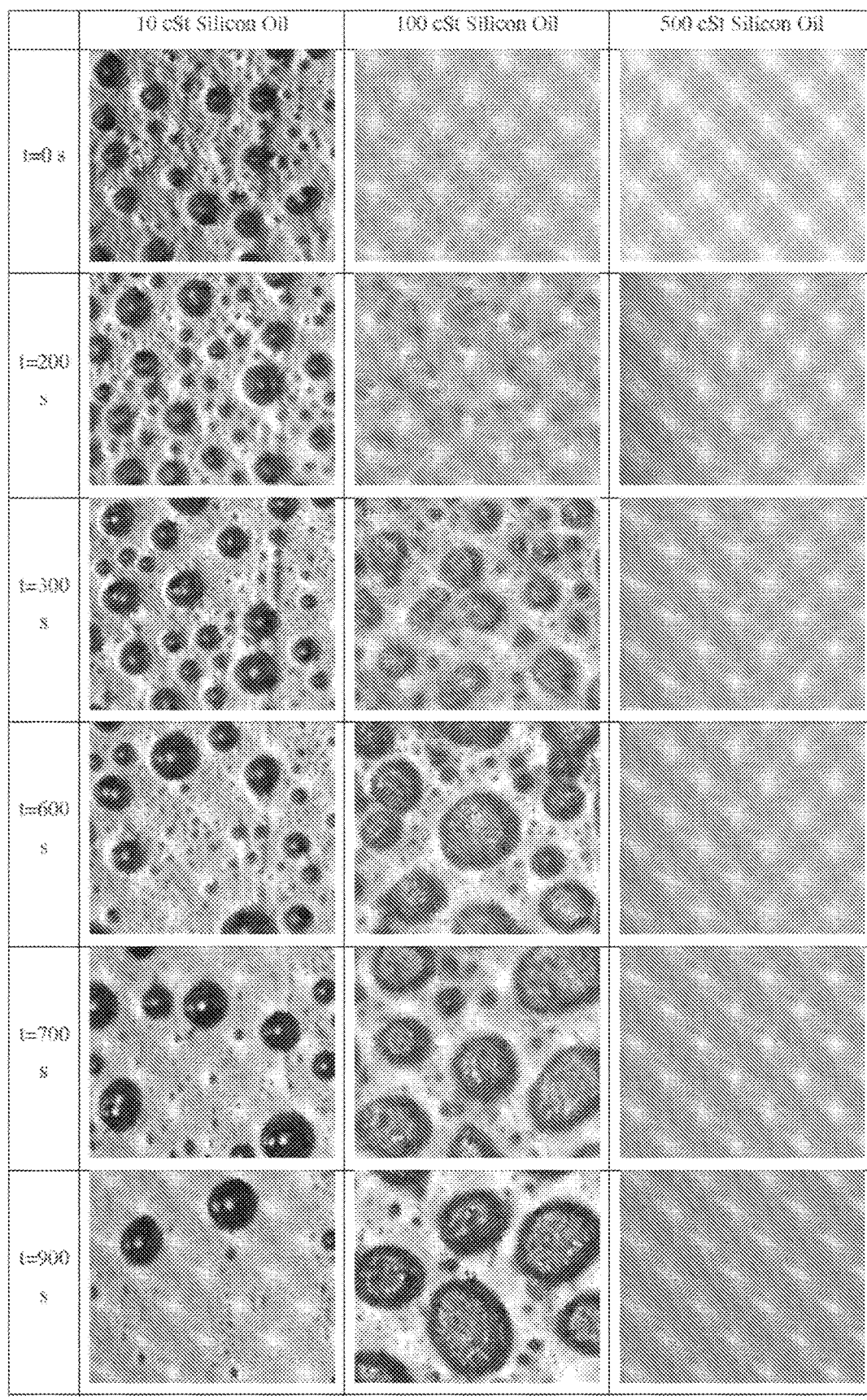
FIG. 9 demonstrates condensation inhibition by the decreased drainage rate of oil between neighboring water droplets, particularly where the oil has high viscosity, in accordance with certain embodiments of the invention.

Similar to the conditions described in Example 2, the temperature of the peltier cooler was set at −5° C. The room temperature was 20° C., and the dew point in the conditions was 12° C. As can be seen in FIG. 9, the condensation growth rate is significantly decreased as viscosity of the oil increases. Upon condensation on liquid-impregnated surfaces with $S_{ow}>0$, coalescence is significantly inhibited because of the presence of the cloaking oil film between droplets. As viscosity of the oil increases, the force required to drain the oil film between two neighboring droplets also increases and hence condensation/frost growth is inhibited. Further, the more viscous an oil, the less rapid the deformation of its surface upon adsorption of vapor molecules, and this may reduce the rate of formation of condensed droplets, as well.

Example 4

This Example demonstrates that frost can be inhibited by decreasing the drainage rate of oil from condensed structures, particularly where the oil has high viscosity.

Figure 10:
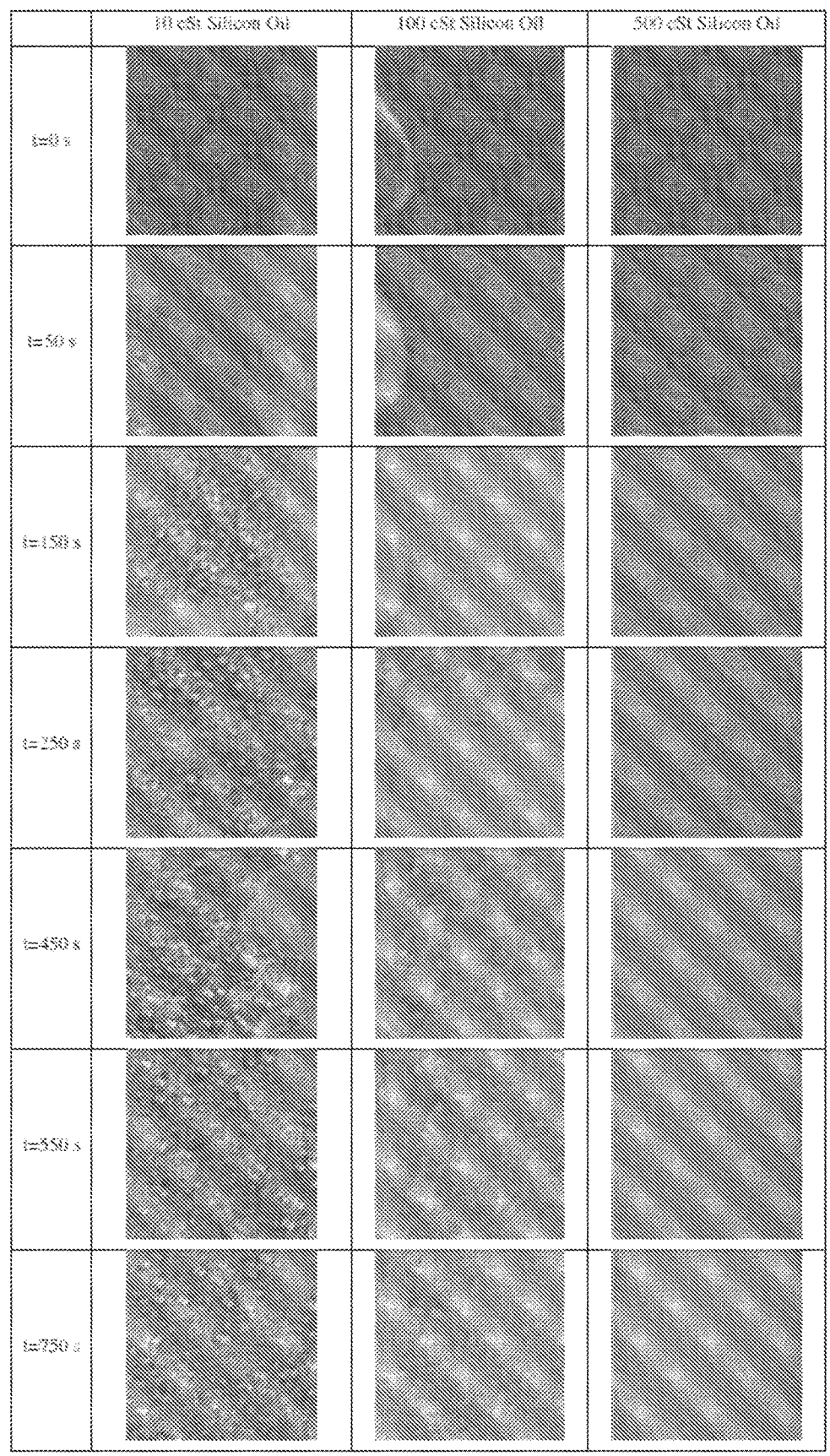
FIG. 10 demonstrates frost inhibition because of decreased drainage rate of oil between neighboring water droplets, particularly where the oil has high viscosity, in accordance with certain embodiments of the invention.

Similar to the conditions described above, the temperature of the peltier cooler was set at −15° C. The experiments were conducted in low relative humidity environment such that the dew point in these conditions was −10° C. In these conditions, water vapor forms directly as frost on the peltier plate. However, on the impregnated surface, water vapor still forms as droplets, and frost. As can be seen in FIG. 10, the frost formation rate is significantly decreased as viscosity of the oil increases. On low viscosity liquid, the water phase shows mobility signifying that water exists as supercooled droplets.

Example 5

This example demonstrates results of a series of experiments that included flowing a number of different external phases on a number of different solid surfaces impregnated with different impregnating liquids. The results of the conducted experiments are shown in Table 1 below. In Table 1 below, $\theta_{os(a),receding}$ is the receding contact angle of the impregnating liquid (e.g., silicone oil, subscript 'o') on the surface (subscript 's') in the presence of air (subscript 'a'), and where $\theta_{os(a),receding}$ is the receding contact angle of the impregnating liquid (e.g., silicone oil, subscript 'o') on the surface (subscript 's') in the presence of the external phase (subscript 'e'). $\theta^*_c = \cos^{-1}(1/r)$ is the critical contact angle on the textured substrate and $\alpha^*$ is the roll-off angle.

TABLE 1

Experimental determination of roll-off angles.

| External phase (e) | Solid (s) | Impregnating liquid (o) | $\Theta_{os(a), receding}$ (°) | $\Theta_{os(e), receding}$ (°) | $\cos^{-1}(1/r) = \theta_c^*$ (°) | $\theta_{os(a), receding}, \theta_{os(e), receding} < \theta^*_c$ | $\alpha^*$ (°) |
|---|---|---|---|---|---|---|---|
| Mayonnaise | CW | PDC | 0 | 37 | 47 | Yes | 5 |
| Toothpaste | CW | PDC | 0 | 25 | 47 | Yes | 3 |
| Toothpaste | WPTFE | PDC | 20 | 67 | 50 | No | 45 |
| WB Paint | WPTFE | PDC | 20 | 67 | 50 | No | 65 |
| WB Paint | WPTFE | Krytox 1506 | 2 | 35 | 50 | Yes | 15 |
| Peanut Butter | WPTFE | PDC | 20 | 90 | 50 | No | 70 |
| Peanut Butter | WPTFE | CL | 5 | 35 | 50 | Yes | 20 |
| DI Water | OTS-treated silicon | Silicone oil | 0 | 0 | 60 | Yes | ~1 |

TABLE 1-continued

Experimental determination of roll-off angles.

| External phase (e) | Solid (s) | Impregnating liquid (o) | $\Theta_{os(\alpha), receding}$ (°) | $\Theta_{os(e), receding}$ (°) | $\text{Cos}^{-1}(1/r) = \theta_c^*$ (°) | $\Theta_{os(\alpha), receding}, \Theta_{os(e), receding} < \theta^*_c$ | $\alpha^*$ (°) |
|---|---|---|---|---|---|---|---|
| DI Water | Silicon | Silicone oil | 0 | 122 | 60 | No | Did not roll off, even at 90° |

Slide off angles were measured using 500 μL volumes of the external fluid, except for water, for which 5 μL droplets were used. It was observed that in experiments where $\theta_{os(e),rec} < \theta_c^*$, the roll-off angles, $\alpha^*$, were low (e.g., less than or equal to 20°), whereas in cases where $\theta_{rec,os(e)} > \theta_c^*$, the roll-off angles, $\alpha^*$, were high (e.g., greater than or equal to 40°).

The silicon surfaces used in the experimental data shown in Table 1 above were 10 μm square silicon posts (10×10×10 μm) with 10 μm interpilar spacing. The 10 μm square silicon microposts were patterned using photolithographic and etched using deep reactive ion etching (DRIE). The textured substrates were cleaned using piranha solution and were coated with octadecyltrichlorosilane (OTS from Sigma-Aldrich) using a solution deposition method.

The "WPTFE" surfaces shown in Table 1 above were composed of a 7:1 spray-coated mixture of a mixture of Teflon particles and Toko LF Dibloc Wax, sprayed onto a PET substrate. The carnauba wax (CW) surfaces were composed of PPE CW spray-coated onto a PET substrate. The impregnating liquids were propylene di(caprylate/caprate) ("PDC"), Krytox 1506, DOW PMX 200 silicone, oil, 10 cSt ("Silicone oil") and Christo-lube EXP 101413-1 ("CL"). The external phases used were mayonnaise, toothpaste (e.g., Crest extra whitening), and red water based paint. Wenzel roughness, r, was measured using a Taylor hobson inferometer. Although precise estimates of $\phi$ could not be easily obtained, it was observed in the inferometer that $\phi$ was much less than 0.25 for all the impregnated surfaces described in the table, and tested, and using 0.25 as an upper bound on $\phi$ for our surfaces we determine that $\cos^{-1}((1-\phi)/(r-\phi)) = \theta_c$ is no more than 5° greater than the values for $\theta^*_c$.

Materials and Methods—Lubricant-Impregnated Surfaces

Figure 12A:
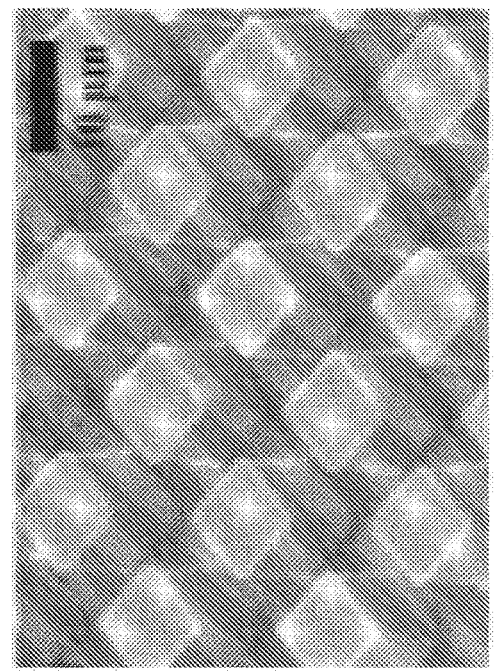
FIG. 12A is a SEM image of a silicon micropost array, in accordance with certain embodiments of the invention.
Figure 13:
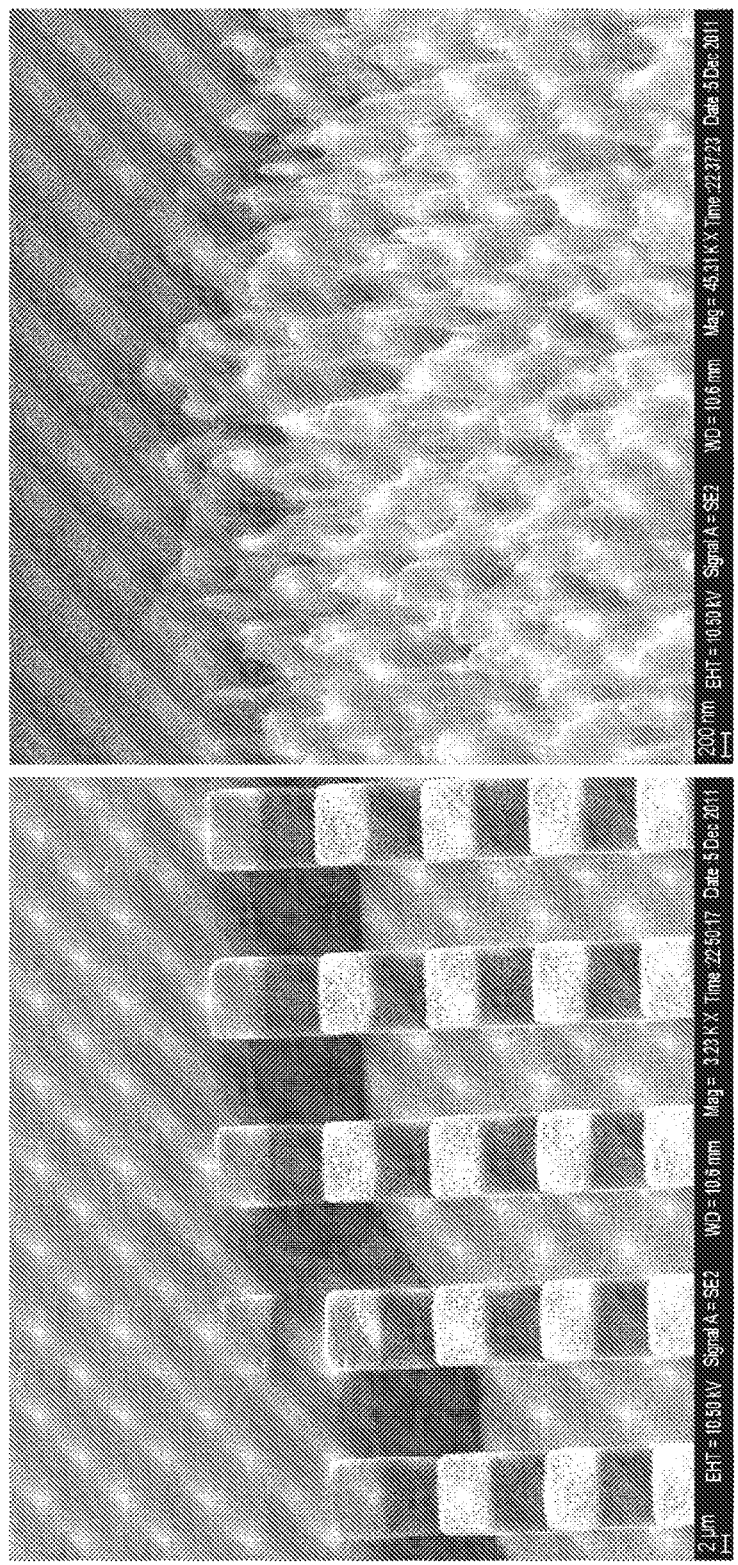
FIG. 13 shows SEM images of nanograss-covered silicon micropillars impregnated with an ionic liquid (BMIm), in accordance with certain embodiments of the invention. In some embodiments, BMIm completely fills the voids between the nano-ridges, as shown on the right, resulting in almost no exposure of the solid surface to air after dip-coating ($\phi \cong 0$).

The textured substrates used in the examples discussed below were square microposts etched in silicon using standard photolithography process; these square microposts are shown in FIG. 12A. A photomask with square windows was used and the pattern was transferred to photoresist using UV light exposure. Next, reactive ion etching in inductively-coupled plasma was used to etch the exposed areas to form microposts. Each micropost had a square geometry with width a=10 m, height h=10 m, and varying edge-to-edge spacing b=5, 10, 25, and 50 m.

Figure 12B:
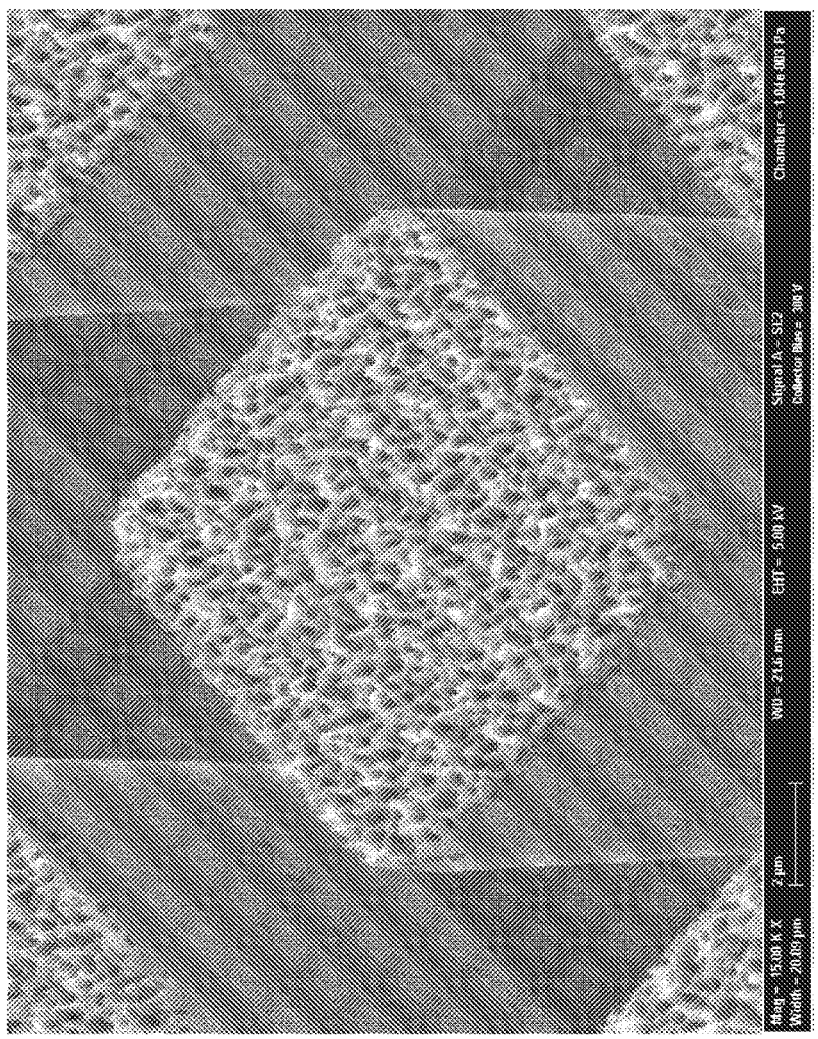
FIG. 12B is a SEM image of silicon microposts etched with nanograss, in accordance with certain embodiments of the invention.

A second level of roughness was produced on microposts in some embodiments by creating nanograss, as shown in the SEM image of FIG. 12B. For this purpose, Piranha-cleaned micropost surfaces were etched in alternating flow of $SF_6$ and $O_2$ gases for 10 minutes in inductively-coupled plasma. The samples were then cleaned in a Piranha solution and treated with a low-energy silane (octadecyltrichlorosilane—OTS) by solution deposition. The samples were impregnated with lubricant by slowly dipping them into a reservoir of the lubricant. They were then withdrawn at speed S slow enough that capillary numbers $Ca = \mu_o S / \gamma_{oa} < 10^{-5}$ to ensure that no excess fluid remained on the micropost tops where $\mu_o$ is the dynamic viscosity and $\gamma_{oa}$ is the surface tension of the lubricant. In some embodiments, when the advancing angle $\theta_{adv,os(a)}$ is less than $\theta_c$ (see Table 4 below) the lubricant film will not spontaneously spread into the textured surface, as can be seen for BMIm (1-butyl-3-methylimidazolium bis (trifluoromethylsulfonyl) imide) in FIG. 13. However, by withdrawing the textured surfaces from a reservoir of BMIm, the impregnating film remains stable, since $\theta_{rec,os(a)} < \theta_c$ for the microposts with b=5 μm and 10 μm.

Laser Confocal Fluorescence Microscope (LCFM) Imaging

In order to determine whether or not the micropost tops were covered with lubricant after dipping, a LCFM (Olympus FV 300) was used. A florescent dye (DFSB-175, Risk Reactor, CA) was dissolved in the lubricant, and the textured substrate was impregnated with the dyed lubricant using dip coating, as explained above. The dye gets excited at wavelengths of ~400 nm, and the resulting emittance was captured by the microscope. In some embodiments, as the focused laser beam scanned through the sample, areas containing dye appeared bright, indicating the presence of lubricant. This is shown, for example, in FIG. 1G on substrates impregnated with silicone oil. In contrast, in some embodiments, BMIm does not wet post tops, which therefore appear dark, as shown, for example, in (FIG. 1H).

Contact angle measurements

Contact angles of silicone oil and BMIm were measured on the OTS-coated silicon surfaces in the presence of air and DI water using a Ramé-Hart Model 500 Advanced Goniometer/Tensiometer. The advancing ($\theta_{adv,os(a)}$, $\theta_{adv,os(w)}$) and receding ($\theta_{rec,os(a)}$, $\theta_{rec,os(w)}$) angles were taken as an average of at least 8 measurements. 5 μl droplets were deposited at a volume addition/subtraction rate of 0.2 μl s$^{-1}$, yielding, in some embodiments, contact line velocities $V_c$ less than 1 mm min$^{-1}$. The resulting capillary numbers were $Ca = \mu_o V_c / \gamma_{o(i)} < 10^{-5}$ ensuring that the measured dynamic contact angles were essentially the same as contact angles obtained immediately after the contact line comes to rest. The measured contact angles are shown in Table 2 below.

Table 2 shows contact angle measurements on smooth OTS-treated silicon surfaces. In some embodiments, a surface that has been dipped in silicone oil maintains an oil film on the surface after a water droplet is deposited because the film cannot dewet the surface since $\theta_{rec,os(w)} = 0°$. Therefore, an oil-water-solid contact line cannot exist and pinning forces must be zero. Accordingly, the oil-solid-water pinning term in Eq.'s (10) and (11) above should be neglected if $\theta_{rec,os(w)} = 0$. Similarly oil-solid-air pinning term should be neglected if $\theta_{rec,os(a)} = 0°$. For this reason, pinning forces are taken to be zero in FIGS. 11A-D for silicone oil, even though $\cos \theta_{rec,os(w)} - \cos \theta_{adv,os(w)} > 0$.

TABLE 2

Contact Angle Measurements on Smooth OTS-Treated Silicon Surfaces.

| Liquid | Substrate | $\theta_{adv,os(a)}$ (°) | $\theta_{rec,os(a)}$ (°) | $\theta_{adv,os(w)}$ (°) | $\theta_{rec,os(w)}$ (°) |
|---|---|---|---|---|---|
| Silicone oil | OTS-treated silicon | 0 | 0 | 20 ± 5 | 0 |
| BMIm | OTS treated silicon | 67.8 ± 0.3 | 60.8 ± 1.0 | 61.3 ± 3.6 | 12.5 ± 4.5 |
| DI water | OTS-treated silicon | 112.5 ± 0.6 | 95.8 ± 0.5 | NA | NA |
| Silicone oil | Silicon | 0 | 0 | 153.8 ± 1.0 | 122 ± 0.8 |
| BMIm | Silicon | 23.5 ± 1.8 | 9.8 ± 0.9 | 143.4 ± 1.8 | 133.1 ± 0.9 |
| DI water | Silicon | 20 ± 5° | 0 | NA | NA |

Table 3 shows surface and interfacial tension measurements and resulting spreading coefficients, $S_{ow(a)} = \gamma_{wa} - \gamma_{ow} - \gamma_{oa}$, of 9.34, 96.4, and 970 cP Dow Corning PMX 200 Silicone oils on water in air. Values of $\gamma_{ow}$ for silicone oil were taken from C. Y. Wang, R. V. Calabrese, *AIChE J.* 1986, 32, 667, in which the authors made measurements using the du Noüy ring method (described in du Noüy, P. Lecomte. "An interfacial tensiometer for universal use." *The Journal of general physiology* 7.5 (1925): 625-631), and values of $\gamma_{oa}$ were provided by Dow Corning. The surface and interfacial tensions for BMIm and Krytox were measured using the pendant drop method (described in Stauffer, C. E., The measurement of surface tension by the pendant drop technique. *J. Phys. Chem.* 1965, 69, 1933-1938). Here, $\gamma_{wa}$, $\gamma_{ow}$, and $\gamma_{oa}$ are the surface and interfacial tensions between phases at equilibrium, that is, after water and the lubricant become mutually saturated.

TABLE 3

Surface and Interfacial Tension Measurements and Resulting Spreading Coefficients

| Liquid | $\gamma_{ow}$(mN/m) | $\gamma_{oa}$ (mN/m) | $\gamma_{wa}$ (mN/m) | $S_{ow(a)}$ (mN/m) |
|---|---|---|---|---|
| Silicone oil (9.34 cP, 96.4 cP) | 46.7 | 20.1 | 72.2 | 5.4 |
| Silicone oil (970 cP) | 45.1 | 21.2 | 72.2 | 5.9 |
| Krytox | 49 | 17 | 72.2 | 6 |
| Ionic liquid | 13 | 34 | 42 | −5 |

Table 4 shows texture parameters b, r, ϕ, and critical contact angles $\theta_c$ defined by $\theta_c = \cos^{-1}((1-\phi)/(r-\phi))$, and $\theta^*_c = \cos^{-1}(1/r)$; h, a=10 μm for all substrates tested. The approximation $\theta_c \sim \theta^*_c$ becomes more accurate as ϕ approaches zero. If the silicon substrate is not coated with OTS, $\theta_{os(w)} > \theta_c$, $\theta^*_c$ for both lubricants and all b values. Thus, water droplets should displace the lubricant and get impaled by the microposts leading to significant pinning, which was confirmed experimentally, as it was observed that such droplets did not roll-off of these surfaces.

TABLE 4

Texture Parameters and Critical Angles.

| Post spacing, b (μm) | r | ∅ | $\theta_c$ (°) | $\theta^*_c$ (°) |
|---|---|---|---|---|
| 5 | 2.8 | 0.44 | 76 | 69 |
| 7.5 | 2.3 | 0.33 | 70 | 64 |
| 10 | 2.0 | 0.25 | 65 | 60 |
| 25 | 1.3 | 0.08 | 42 | 41 |
| 50 | 1.1 | .093 | 26 | 26 |

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An article comprising an interior surface, said article being at least partially enclosed and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin, wherein the impregnating liquid comprises water (the impregnating liquid having viscosity $\mu_2$), wherein viscosity is measured at 20° C., wherein the solid features have a rough surface.

2. The article of claim 1, wherein $\mu_1/\mu_2 > 1$.

3. The article of claim 1, wherein $\mu_1/\mu_2 > 0.1$.

4. The article of claim 1, wherein $(h/R)(\mu_1/\mu_2) > 0.1$ (where h is average height of the solid features and R is the radius of the article).

5. The article of claim 4, wherein $(h/R) (\mu_1/\mu_2) > 0.5$.

6. The article of claim 4, wherein R<1 mm.

7. The article of claim 1, wherein the impregnating liquid comprises an additive to prevent or reduce evaporation of the impregnating liquid.

8. The article of claim 1, wherein said surface comprises a pulled-up region of excess impregnating liquid extending above said solid features.

9. The article of claim 1, wherein the impregnating liquid comprises at least one member selected from the group consisting of silicone oil, propylene glycol dicaprylate/dicaprate, perfluoropolyether (PFPE), polyalphaolefin (PAO), synthetic hydrocarbon cooligomer, fluorinated polysiloxane, propylene glycol, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), p-bromotoluene, monobromobenzene, perchloroethylene, carbon disulfide, phenyl mustard oil, monoiodobenzene, alpha-monochloronaphthalene, acetylene tetrabromide, aniline, butyl alcohol, isoamyl alcohol, n-heptyl alcohol, cresol, oleic acid, linoleic acid, and amyl phthalate.

10. The article of claim 1, wherein the solid features comprise at least one member selected from the group consisting of a polymeric solid, a ceramic solid, a fluorinated solid, an intermetallic solid, and a composite solid.

11. The article of claim 1, wherein the solid features comprise a chemically modified surface, a coated surface, and/or a surface with a bonded monolayer.

12. The article of claim 1, wherein the solid features define at least one member selected from the group consisting of pores, cavities, wells, interconnected pores, and interconnected cavities.

13. The article of claim 1, wherein the solid features comprise at least one member selected from the group consisting of posts, nanoneedles, nanograss, substantially spherical particles, and amorphous particles.

14. The article of claim 1, wherein the rough surface provides stable impregnation of liquid therebetween or therewithin, such that $\theta_{os(v),receding} < \theta_c$, where $\theta_c$ is critical contact angle.

15. The article of claim 1, wherein the liquid-impregnated surface is configured such that water droplets contacting the surface are not pinned or impaled on the surface and have a roll-off angle α of less than 40°.

16. The article of claim 15, wherein the water droplets have a roll-off angle α of less than 25°.

17. An article comprising an interior surface, said article being at least partially enclosed and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin,
wherein the impregnating liquid comprises water (the impregnating liquid having viscosity $\mu_2$),
wherein $(h/R)(\mu_1/\mu_2) > 0.1$ (where h is average height of the solid features and R is the radius of the article, and
wherein R<1 mm.

18. An article comprising an interior surface, said article being at least partially enclosed and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin,
wherein the impregnating liquid comprises water (the impregnating liquid having viscosity $\mu_2$),
wherein the impregnating liquid further comprises at least one member selected from the group consisting of silicone oil, propylene glycol dicaprylate/dicaprate, perfluoropolyether (PFPE), polyalphaolefin (PAO), synthetic hydrocarbon cooligomer, fluorinated polysiloxane, propylene glycol, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, and amyl phthalate.

* * * * *